United States Patent
Ito et al.

(10) Patent No.: US 6,578,618 B2
(45) Date of Patent: Jun. 17, 2003

(54) LAMINATING APPARATUS

(75) Inventors: Akira Ito, Nagoya (JP); Nobuo Kato, Nagoya (JP); Masaru Moriguchi, Nagoya (JP); Motohito Muraki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/178,230

(22) Filed: Jun. 25, 2002

(65) Prior Publication Data

US 2002/0166638 A1 Nov. 14, 2002

Related U.S. Application Data

(63) Continuation of application No. 09/664,051, filed on Sep. 18, 2000, now Pat. No. 6,431,243.

(30) Foreign Application Priority Data

Sep. 16, 1999  (JP) ............................................. 11-262262
Sep. 16, 1999  (JP) ............................................. 11-262264

(51) Int. Cl.$^7$ ............................................. B32B 31/04
(52) U.S. Cl. ........................................ 156/555; 152/582
(58) Field of Search ................................. 156/552, 555, 156/580, 582, 583.1; 100/327, 160, 176

(56) References Cited

U.S. PATENT DOCUMENTS

| 5,160,399 A | 11/1992 | Ueda et al. ................... 156/359 |
| 5,571,368 A | 11/1996 | Barge ........................... 156/359 |
| 5,580,417 A | 12/1996 | Bradshaw .................... 156/495 |
| 5,584,962 A | 12/1996 | Bradshaw et al. ........... 156/495 |
| 5,639,339 A | 6/1997 | Couillard ..................... 156/555 |
| 5,735,998 A | 4/1998 | Bradshaw .................... 156/495 |
| 5,853,531 A | 12/1998 | Murphy et al. .............. 156/555 |
| 5,888,342 A | 3/1999 | Reinders ...................... 156/494 |
| 5,961,779 A | 10/1999 | Bradshaw .................... 156/495 |
| 6,431,243 B1 * | 8/2002 | Ito et al. ...................... 156/555 |

FOREIGN PATENT DOCUMENTS

| JP | 10-507005 | 7/1998 |
| JP | 2000-168020 | 6/2000 |
| WO | WO 95/00430 | 1/1995 |

OTHER PUBLICATIONS

European Search Report.

* cited by examiner

*Primary Examiner*—James Sells
(74) *Attorney, Agent, or Firm*—Oliff & Berridge, PLC

(57) ABSTRACT

A laminate apparatus having a laminate target supply unit that supplies a laminate target along a supply path, a sheet supply unit in which a pair of upper and lower sheets being wound in roll shape are detachably mounted, the sheet supply unit supplying a pair of sheets to laminate the laminate target, a laminate processor, a laminate processor that laminates the laminate target supplied with the pair of sheets when the laminate target is sandwiched between the pair of sheets and then feeds the laminated product outwardly. The laminate processor includes a pair of upper and lower pinch rollers disposed in the laminating processor, a pair of upper and lower sheet guide portions disposed between the pinch rollers and the sides of the sheets drawn from the pair of sheet rolls. The sheets drawn from the sheet rolls contact the sheet guide portions and the centers of each sheet roll are disposed at positions apart from leadlines of the sheets which connect the peripheries of the pinching roller in the slide contact portions of the sheet guides.

12 Claims, 16 Drawing Sheets

LAMINATING APPARATUS

CROSS-REFERENCE TO RELATED APPLICATIONS

This application contains subject matter that is related to U.S. patent application Ser. No. 09/664,051, filed Sep. 18, 2000. U.S. Pat. No. 6,431,243. The two co-pending applications have common inventors and are commonly owned or assigned.

BACKGROUND OF THE INVENTION

1. Field of the Invention

The invention relates to a laminating apparatus that covers and adheres the front and back surfaces of a laminate target, such as paper, using a sheet made of synthetic resin.

2. Description of Related Art

There has been known a laminating apparatus for laminating a medium, such as a card, by a sheet of synthetic resin film.

National Stage Laid-Open Patent Publication (KOUHYOU) No. 10-507005 based on a PCT application discloses an example of the laminating apparatus described above. In the laminating apparatus, a pair of sheet rolls which are wound around each sheet thereof for laminating both surfaces of paper are rotatably supported at upper and lower positions in a sheet cassette, and the sheet cassette can be detachably mounted to a sheet supply unit of the laminating apparatus.

In the laminating apparatus, a pair of upper and lower pinch rollers are disposed at the paper feed-out side of the sheet cassette. Both pinch rollers are structured so as to rotate in synchronization with a turn of an external handle.

Paper put on a paper supply tray is fed to the gap between the upper and lower sheet rolls, and the paper is sandwiched therebetween and laminated while drawing the upper and lower sheets. In this case, the sheet has an adhesive layer on one side thereof (pinching surface). A laminate thus formed is cut in an X direction (the direction perpendicular to a feed direction of the paper) using a cutter blade. Accordingly, the paper laminated by sheets of a PET film (laminate) can be obtained.

However, in the conventional apparatus, upper and lower sheet rolls are drawn from each periphery near a paper feed path between centers of rotation of the sheet rolls and are directly pinched at the pinch roller portion. Paper is fed to the pinching position, so that a pinch angle when the paper and the sheets are pinched by the pinch rollers (which is a contained angle formed by straight lines which connects the peripheries of each sheet roll and peripheries of the pinching side of the pinch rollers and the paper feed path) is small when the diameter of the sheet roll is large. The degree of the pinch angle increases as the diameter of the sheet rolls becomes smaller.

Laminating action varies according to the pinch angle existing when the sheets for laminating the paper and the paper to be laminated are pinched. That is, when the pinch angle is small, the adhesive layers of the sheets adhere to the surfaces of the paper upstream from a pinching point by the pinch rollers (upstream to the paper feed direction), so that the sheets and the paper adhere to each other before a pinching pressure is applied to them by pinch rollers. Therefore, problems occur that the sheets or the paper become wrinkled or air bubbles are bounded between the sheets and the paper.

On the other hand, when the pinch angle is too large, for example, approximately 90 degrees, a resistance of drawing the sheets from the sheet rolls increases, so that the laminating operation becomes difficult. Such a problem often arises when the sheet roll having a large diameter, that is, the sheet roll for laminating large sized paper, is used.

Incidentally, it has been desired that laminate targets having various widths would be laminated in the market. To respond to a demand to laminate an A3-size laminate target having a wide width, a laminating apparatus for laminating the A3-size laminate target (hereinafter referred to as a laminating apparatus for A3-size paper) has been developed.

However, in the laminating apparatus for A3-size paper, the width of the axial direction of the sheet roll for A3-size paper is larger than the width of the conventional sheet rolls for A4-size paper or A6-size paper. Further, the feed length of the sheet drawn from the sheet roll for A3-size paper for one lamination is normally longer than the feed length of the sheet drawn from the sheet roll for A4-size paper or A6-size paper. Therefore, the length of the sheet wound in the sheet roll for A3-size paper is longer than that in either sheet roll for A4-size paper or A6-size paper. In other words, a diameter of the sheet roll for A3-size paper is larger than that of either sheet roll for A4-size paper or A6-size paper.

Accordingly, in the sheet cassette for A3-size paper, the width of the axial direction of the sheet cassette, the thickness of the sheet cassette in the direction of the supply path, and the height of the sheet cassette in the direction perpendicular to the direction of the supply path were large compared with those in either sheet cassette for A4-size paper or A6-size paper.

Therefore, the width of the cassette acommodating portion in the direction perpendicular to the direction of the supply path and the thickness of the cassette accommodating portion in the direction of the supply path in the laminating apparatus for A3-size paper are large compared with those of the conventional cassette accommodating portion, so that neither sheet cassette for A4-size paper nor the sheet cassette for A6-size paper can be accommodated or secured in the cassette accommodating portion.

Further, as to the supply path for laminating a laminate target in the sheet cassette for A3-size paper, the diameter of the sheet roll for A3-size paper is larger than that of the sheet roll for either A4-size paper or A6-size paper, so that the laminate target insertion port and the laminate target feed-out portion of the sheet cassette for A3-size paper are located at a higher position compared with those of either sheet cassette for A4-size paper or A6-size paper.

Accordingly, when either sheet cassette for A4-size paper or A6-size paper is accommodated in the cassette accommodating portion in the laminating apparatus for A3-size paper as it is, the supply path is located at a lower position in the sheet supply unit. Therefore, a laminate target put on the laminate target supply unit (paper tray) could not pass either the laminate target insertion port or the laminate target feed-out port of the sheet cassettes for A4-size paper and A6-size paper.

For the reason described above, neither conventional sheet cassette for A4-size paper nor for A6-size paper can be set in the laminating apparatus for A3-size paper as it is.

Alternatively, in order to laminate a laminate target whose size is A4 or smaller in the laminating apparatus for A3-size paper, it is conceivable that there is a method by which a laminate target is laminated using the sheet cassette for A3-size paper whereby an unnecessary portion of the sheet which exceeds a projection area of the laminate target is cut or a method whereby new sheet cassettes for A4-size paper and for A6-size paper which can be mounted in the laminating apparatus for A3-size paper are developed.

However, in the method by which a laminate target is laminated using the sheet cassette for A3-size paper and an unnecessary portion of the sheet which exceeds a projection area of the laminate target is cut, an area corresponding to the unnecessary portion becomes large as the size of the laminate target becomes small, so that a yield of the sheet becomes low and it is inefficient.

Further, in the method by which new sheet cassettes for A4-size paper and A6-size paper which can be mounted in the laminating apparatus for A3-size paper are developed, there were problems that it takes a lot of trouble and time to develop such sheet cassettes and the operating costs become expensive because consumers have to buy the sheet cassettes for each laminating apparatus.

SUMMARY OF THE INVENTION

Therefore, the invention is made to solve the aforementioned problems of the prior art and it is an object of the invention to provide a laminating apparatus capable of maintaining laminating action substantially constantly regardless of the size of the diameter of sheet rolls and capable of laminating various sized papers (laminate targets).

According to a first aspect of the invention, a laminating apparatus may comprise a laminate target supply unit that supplies a laminate target, a sheet supply unit in which a pair of upper and lower sheets being wound in a roll shape are detachably mounted, and that supplies the pair of sheets, and a laminate processor that laminates the laminate target supplied from the laminate target supply unit with the pair of sheets supplied from the sheet supply unit while the laminate target is sandwiched between the pair of sheets and fed out as a laminated product, wherein a laminate processor including a pair of upper and lower pinch rollers that are rotatably disposed in the laminating processor, and a pair of upper and lower sheet guide portions disposed between both pinch rollers, and sides of drawing the sheets from the pair of sheet rolls, wherein the sheets are drawn from peripheries of the upper and lower sheet rolls that are apart from the center of each upper and lower sheet rolls in an upper and a lower directions so that outer surfaces of each sheet slide and contact at the sheet guide portions, the centers of each sheet roll are disposed at the positions that are apart from extension lines of sheet leading directions connecting a respective periphery of a pinching side of each pinch roller and slide contact portions of the sheet guides.

With this arrangement, the outer surfaces of the sheets drawn from the peripheries of each sheet roll are surely warped at the slide contact portions of the upper and lower guide portions and then are let to the pinching portion of the pinch rollers, which includes a certain pinch angle, along the lead lines of the sheets.

Therefore, regardless of the winding diameter size of the sheet roll in the pristine condition or the size change of the winding diameter through the use of the sheets, remarkable effects are produced such that the pinch angles become constant and the laminating action is maintained constant.

According to a second aspect of the invention, in the laminating apparatus of the first aspect of the invention, the center of the sheet roll is positioned so as to be apart from the sheet guide portions to a laminate target leading side in proportion to a size of the winding diameter of the sheet in a pristine condition. With this arrangement, as in the case where the sheet rolls are mounted using the sheet cassette, the pinch angles become constant and, thus, the laminating action is maintained constant regardless of the size of the initial winding diameter of the sheet rolls or the changes of the diameters of the sheet rolls through the use of the sheets.

According to a third aspect of the invention, in the laminating apparatus of the first aspect of the invention, a sheet cassette, in which the sheets wound in a roll shape are accommodated, is structured so as to be detachably mounted in the sheet supply unit and the sheet cassette is provided with the sheet guide portions. The sheet cassette accommodating sheet rolls having a large winding diameter in pristine condition and the sheet cassette accommodating sheet rolls having a small winding diameter in pristine condition can be disposed so as to produce the same laminating action on both sized sheet cassettes.

Further, according to a fourth aspect of the invention, in the laminating apparatus of the third aspect of the invention, a dimension of a feed direction of the laminate target in the sheet supply unit is formed to correspond to the sheet cassette accommodating the sheet having a winding large diameter, the sheet supply unit is structured so that an attachment can be mounted thereof, and a sheet cassette accommodating the sheet having a small winding diameter is detachably attached to the attachment at a position adjacent to the pinch rollers.

In addition to the effects obtained by the invention, the sheet cassette accommodating sheet rolls having a small winding diameter can be mounted in one laminating apparatus using the attachment, and thus an effect that the applicability of the laminating apparatus is expanded is produced.

BRIEF DESCRIPTION OF DRAWINGS

The invention is described in detail with the reference to the following drawings, wherein like numerals represent like elements, and wherein.

DETAILED DESCRIPTION OF THE PREFERRED EMBODIMENTS

Figure 1:
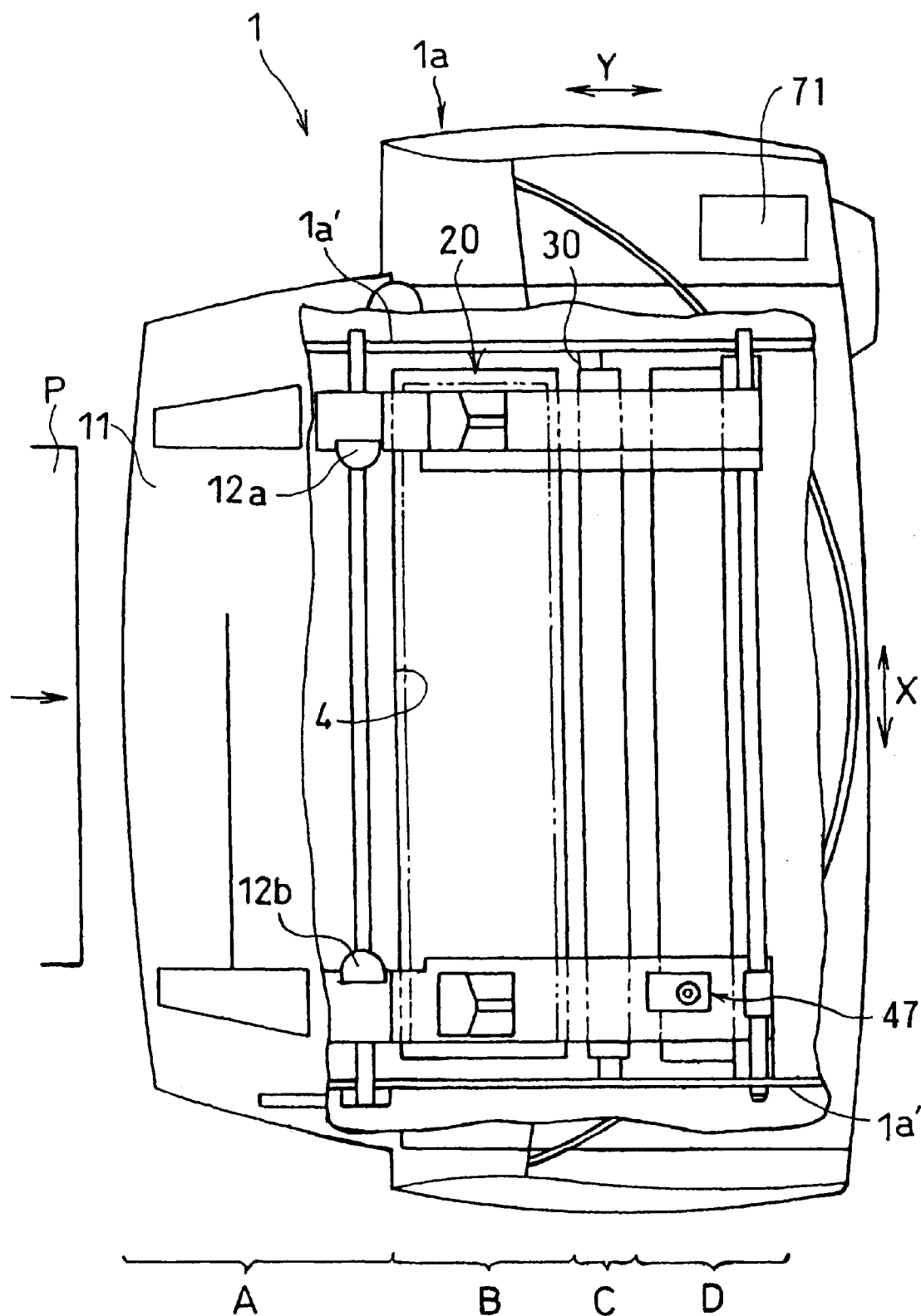
FIG. 1 is a schematic plan view of a laminating apparatus of an embodiment of the invention.
Figure 7:
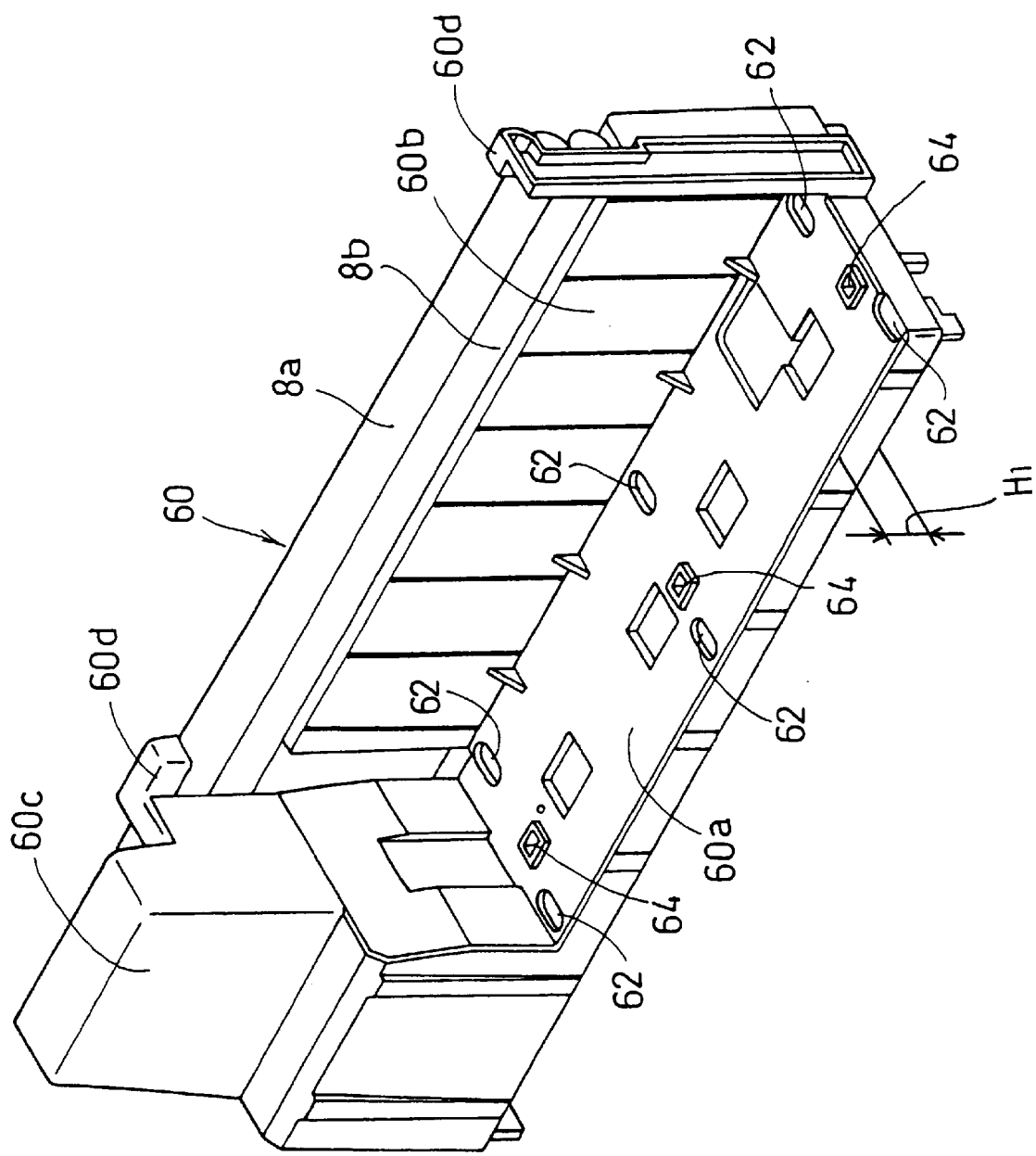
FIG. 7 is a perspective view of the attachment.

Preferred embodiments of the invention will be described. FIG. 1 is a schematic plan view of a laminating apparatus of an embodiment of the invention, FIG. 2 is a schematic plan view of a cassette accommodating portion, FIG. 3 is a side view of the cassette accommodating portion, FIG. 4 is a side sectional view showing a state where a sheet cassette is mounted in the sheet cassette accommodating portion which is mounted on an attachment, FIG. 5 is a perspective view of the sheet cassette for laminating A3-size paper, and FIG. 7 is a perspective view of the attachment.

Figure 2:
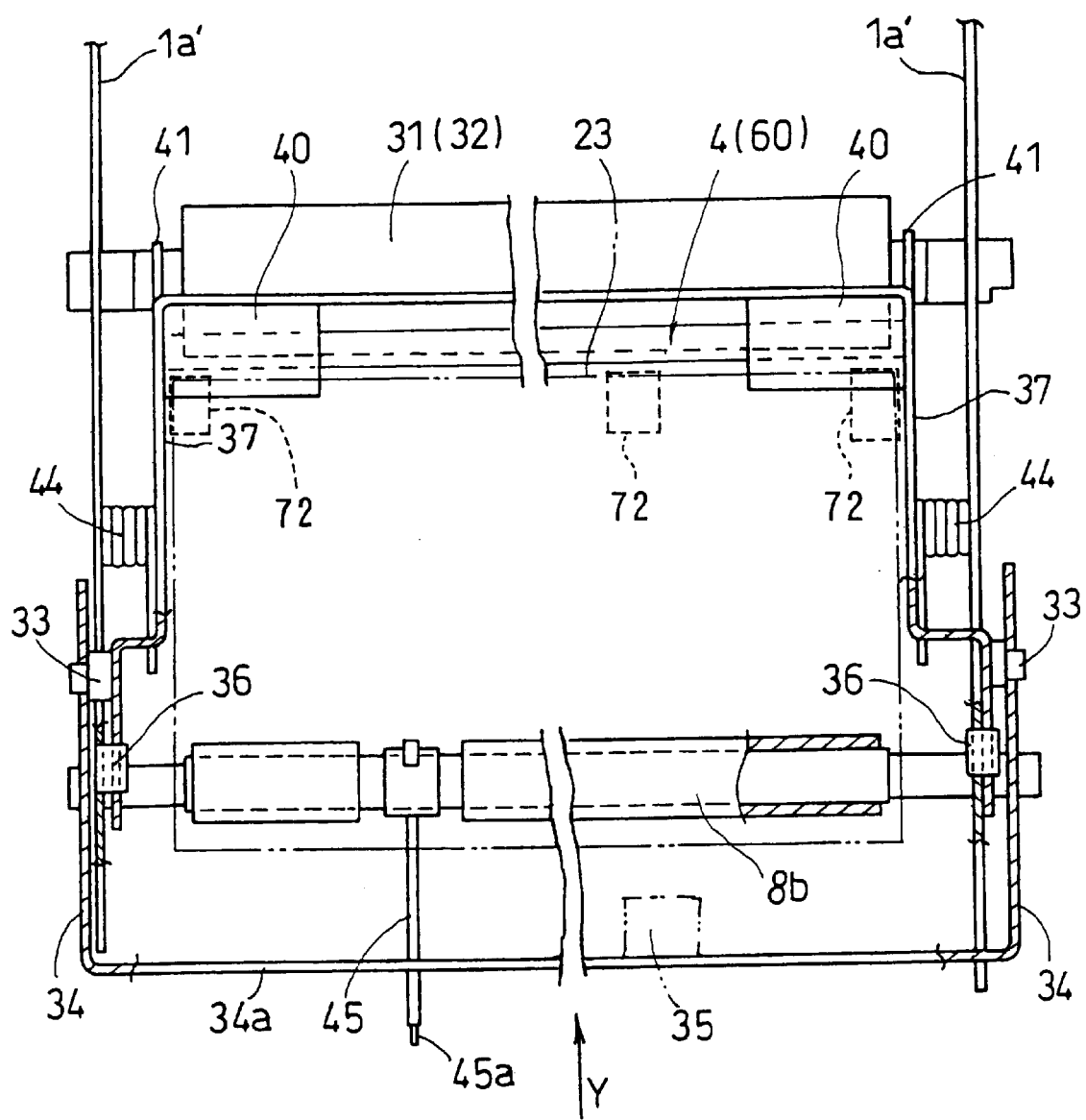
FIG. 2 is a partially cutaway plan view of essential parts of a cassette accommodating portion.
Figure 3:
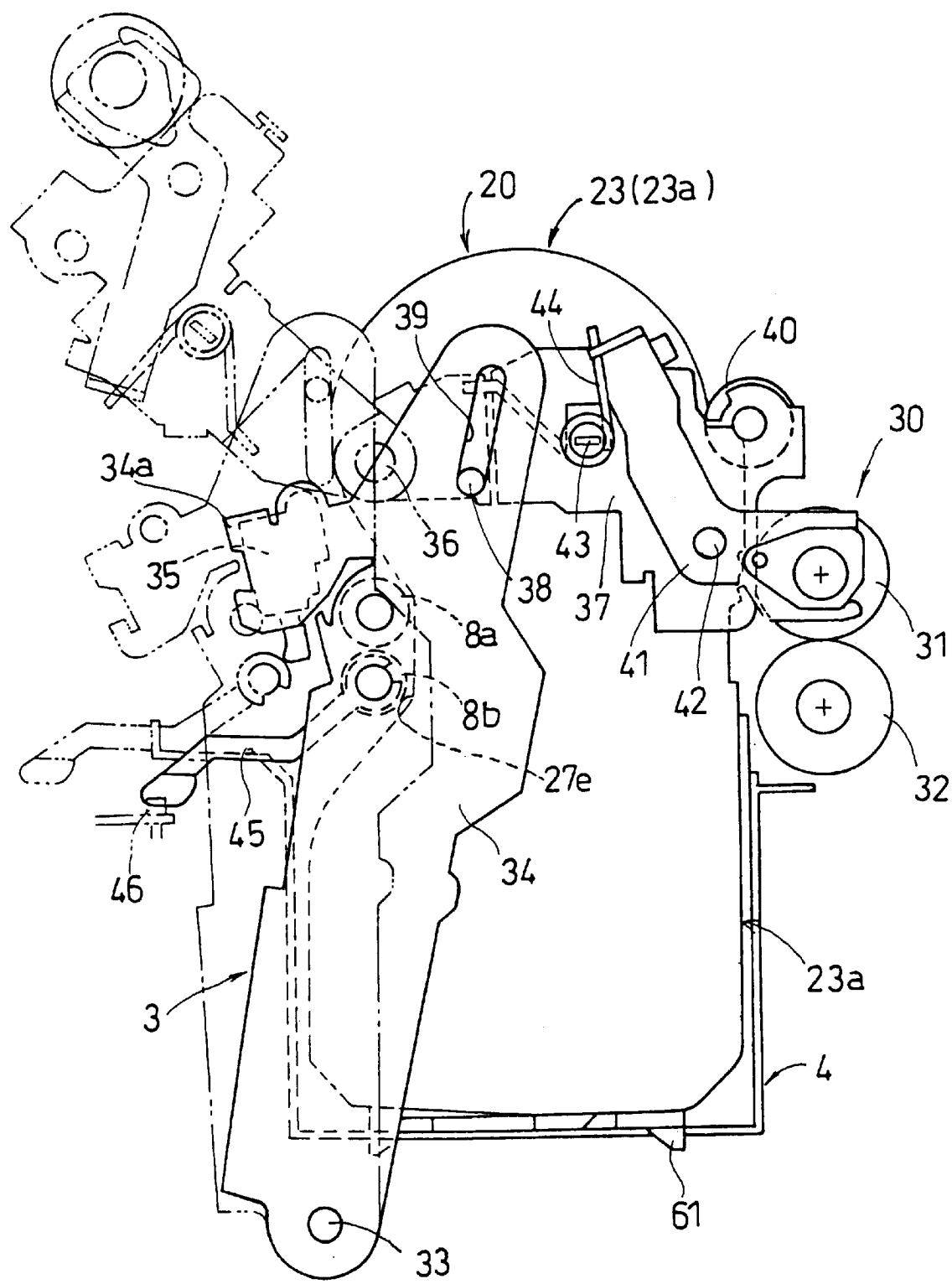
FIG. 3 is a side view of a swing mechanism.
Figure 4:
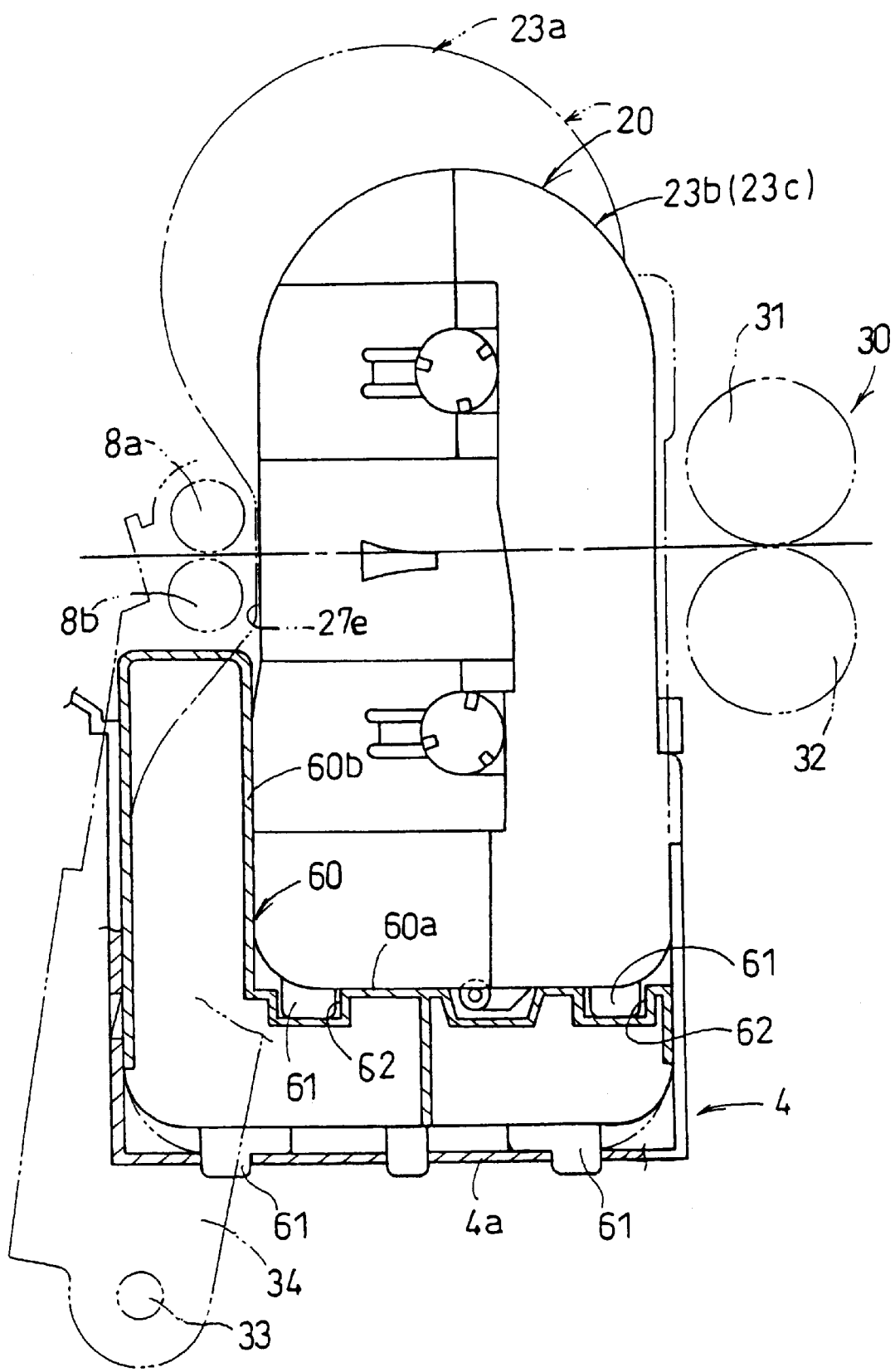
FIG. 4 is a side sectional view showing a state where a sheet cassette for small size paper is mounted in the cassette accommodating portion via an attachment.
Figure 5:
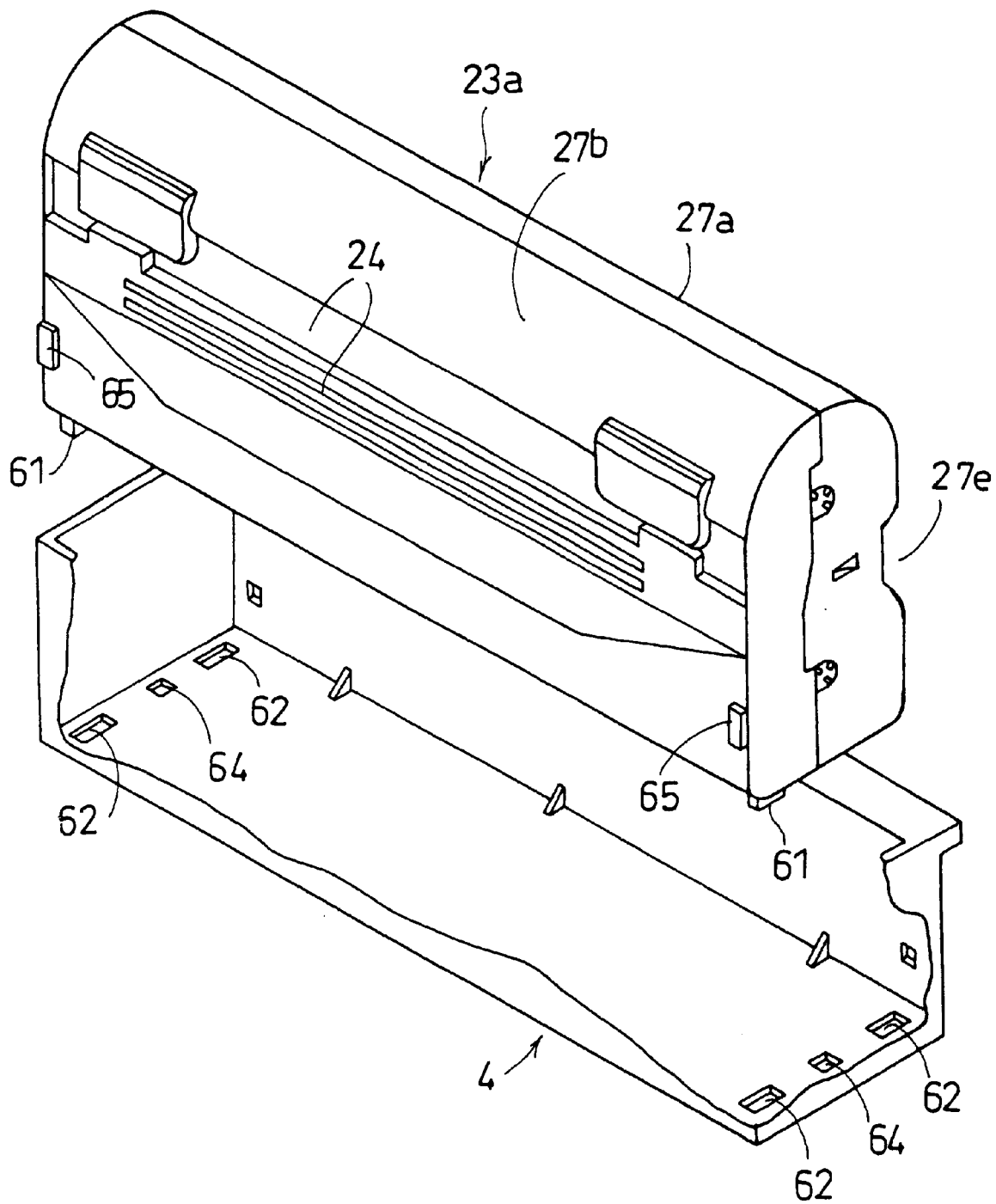
FIG. 5 is a partially cutaway perspective view of a housing of the sheet cassette for A3-size paper used in the laminating apparatus of the embodiment of the invention and the cassette accommodating portion.

In FIGS. 1–5 and 7 laminating apparatus 1 of this embodiment of the invention is covered by an outer housing 1a, and as same as the structure of the prior art, the inside of the laminating apparatus 1 comprises a paper supply unit A, a sheet supply unit B, a laminating processor C, and a cutting unit D, as shown in FIGS. 1 and 2.

The paper supply unit A serves paper P, such as a document, a card, or the like, and the sheet supply unit B serves sheets S1, S2 by which the sheet P is laminated. The laminating processor C serves to laminate the paper P, which is fed out from the paper supply unit A, with the sheets S1, S2 while sandwiching the paper P between the sheets S1, S2, thereby obtaining a laminate R. Further, the cutting unit D serves to cut the laminate R fed out from the laminating processor C, and has not only a function of cutting the laminate R in a Y direction shown in FIG. 1 using a first cutting mechanism (not shown) which is cutter means, but also has a function of cutting the laminate R in an X direction shown in FIG. 1 using a second cutting mechanism 66 shown in FIG. 6 of a longitudinal cutting mechanism 47.

As shown in FIG. 1, a paper supply tray 11 provided to the paper supply unit A, which is a laminate target supply unit, on the left upper side of the outer housing 1a, may be structured so that the paper supply tray 11 can be removed from the outer housing 1a or can fold when not in use.

The paper supply tray 11 has a paper mount face on which the paper P to be laminated is put, and is provided with paper guides 12a, 12b for positioning the paper P in a width direction of the paper P. The paper guides 12a, 12b are supported by the paper supply tray 11 so that at least one of them is freely slidable in the X direction, and thus serves to adjust the distance between a wall face of the outer housing 1a and the paper guide to any value. In this embodiment, sheet cassettes 20 for each paper size are disposed so that the paper P is laminated with respect to the right side of the paper P (the right side when viewed from the feed-out side of the paper P).

Between a base end of the paper supply tray 11 and the front side (a laminate target leading side) of the sheet cassette 20 which is freely detachably mounted on the cassette accommodating portion 4 which has no top surface in the sheet supply unit B, a pair of paper feed rollers 8a, 8b, which are paper feed roller means, are disposed so as to move to and from the laminate target (the paper P) leading side via a swing mechanism 3 which is an interlocking unit described later (see FIGS. 2 through 4).

Figure 6:
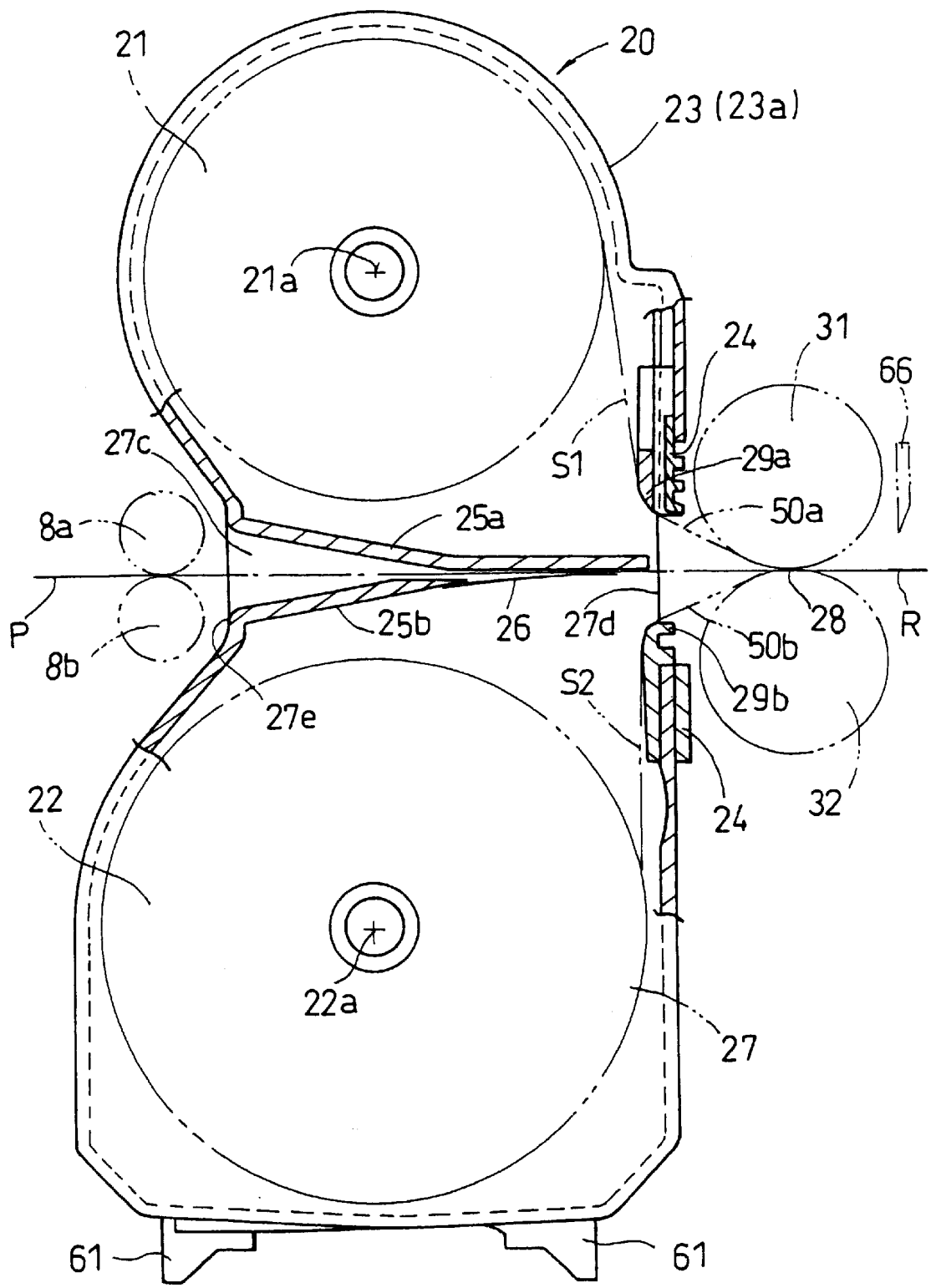
FIG. 6 is a side sectional view of the housing of the sheet cassette for A3-size paper.

The sheet cassette 20, which is freely detachably attached to one of the cassette accommodating portion 4 or an attachment 60 described later, is constructed by containing two sheet rolls 21, 22 in its housing 23 as shown in FIG. 6.

Figure 10:
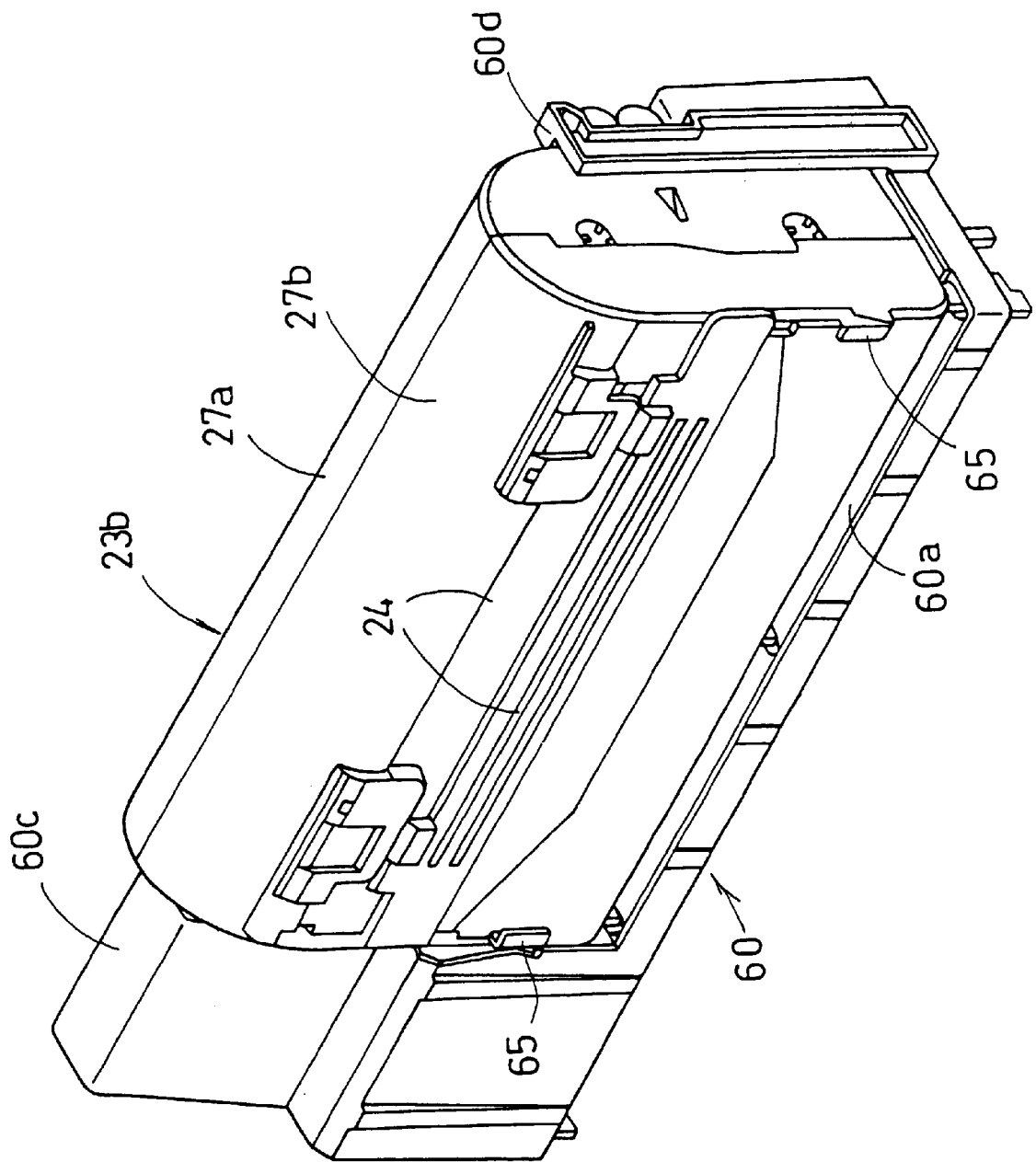
FIG. 10 is a perspective view showing a state where the sheet cassette for A4-size paper is mounted on the attachment.
Figure 11:
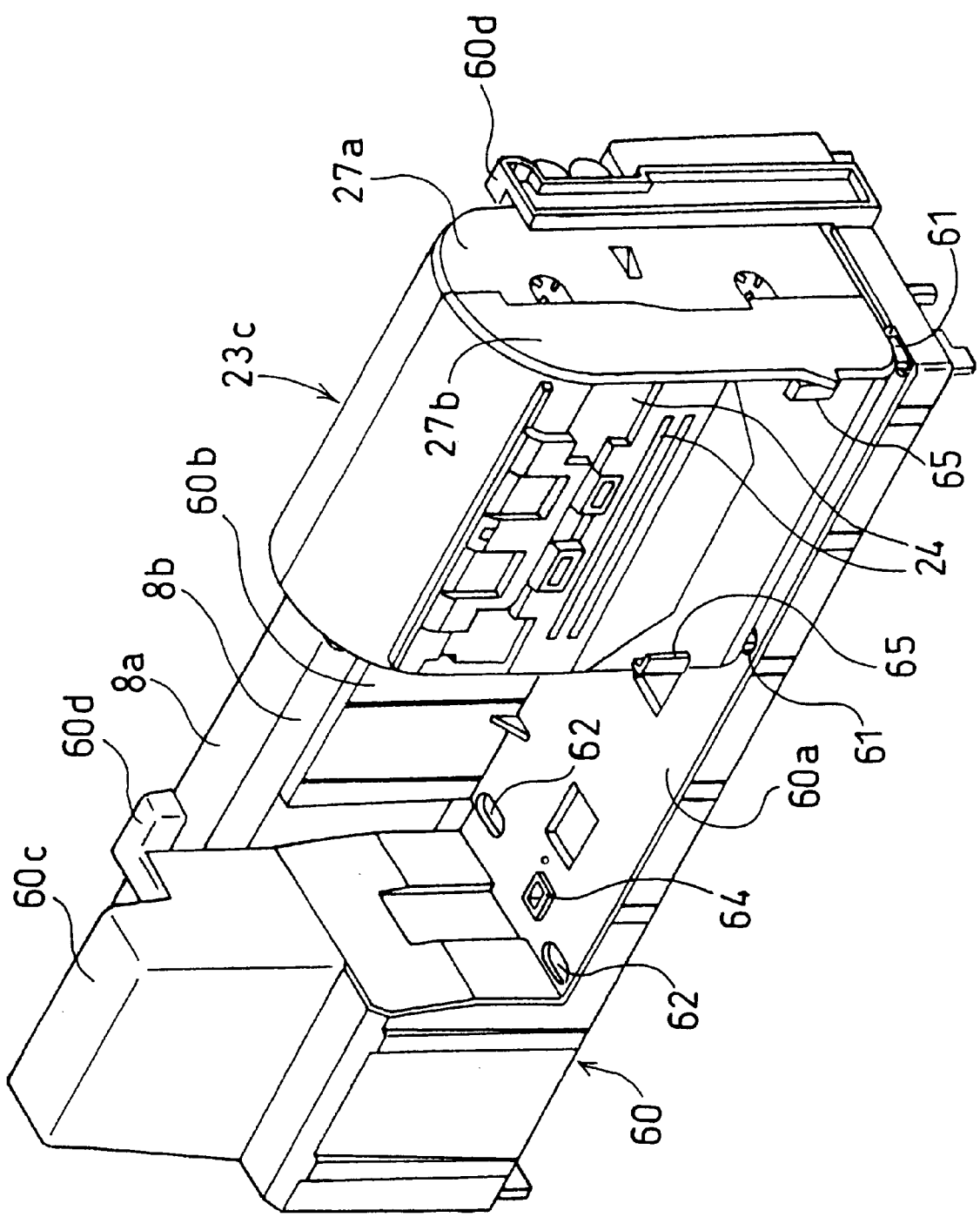
FIG. 11 is a perspective view showing a state where the sheet cassette for A6-size paper is mounted on the attachment.

The laminating apparatus 1 of the invention is structured so that each detachably mounted sheet cassette 20 including different size housing 23 in which two sheet rolls 21, 22 having the width corresponding to A3, A4, or A6-size paper are accommodated, so that the laminating apparatus 1 can laminate at least three sizes of pater, e.g., A3, A4, and A6-size paper P. Hereinafter, a housing for A3-size paper is 23a (see FIGS. 5 and 6), a housing for A4-size paper is 23b (see FIGS. 8 and 10), and a housing for A6-size paper is 23c (see FIGS. 9 and 11).

The housing 23 used in this embodiment is formed by an injection molding method using a synthetic resin material, such as polypropylene resin, and comprises a pair of front and rear cases 27a, 27b. The end portions of the front and rear cases 27a, 27b are mutually engaged with each other and integrated with each other, thereby fabricating the housing 23.

An opening at the front side (an upstream of feed direction of the paper and the laminate target leading side) serves as a paper insertion port 27c, and an opening at the back side (a downstream of feed direction of the paper and laminate target feed-out side) serves as a paper feed-out port 27d.

The paper insertion port 27c has a function of feeding paper P into the gap between the sheet rolls 21, 22. The paper feed-out port 27d has a function of feeding out the paper P fed through the paper insertion port 27c to the laminating processor C together with the sheets S1, S2 fed out from the sheet rolls 21, 22, respectively The paper feed-out port 27d is provided with a pair of upper and lower shutters 24 for opening/closing the paper feed-out port 27d.

A pair of upper and lower guide plates 25a, 25b are provided in the housing 23 so as to extend from the paper insertion port 23a to the paper feed-out port 27d. The guide plates 25a, 25b form a guide path for guiding the paper P fed from the paper insertion port 27c to the paper feed-out port 27d. In this embodiment, the guide plates 25a, 25b are different in length, and the lower guide plate 25b is shorter while the upper guide plate 25a is longer. The lower guide plate 25b is provided with a resin spring 26 for pressing the paper P being fed against the upper guide plate 25a to position the paper P. Accordingly, the paper P fed from the paper insertion port 27c is surely guided to the paper feed-out port 27d by the guide plates 25a, 25c and the resin spring 26.

Figure 12:
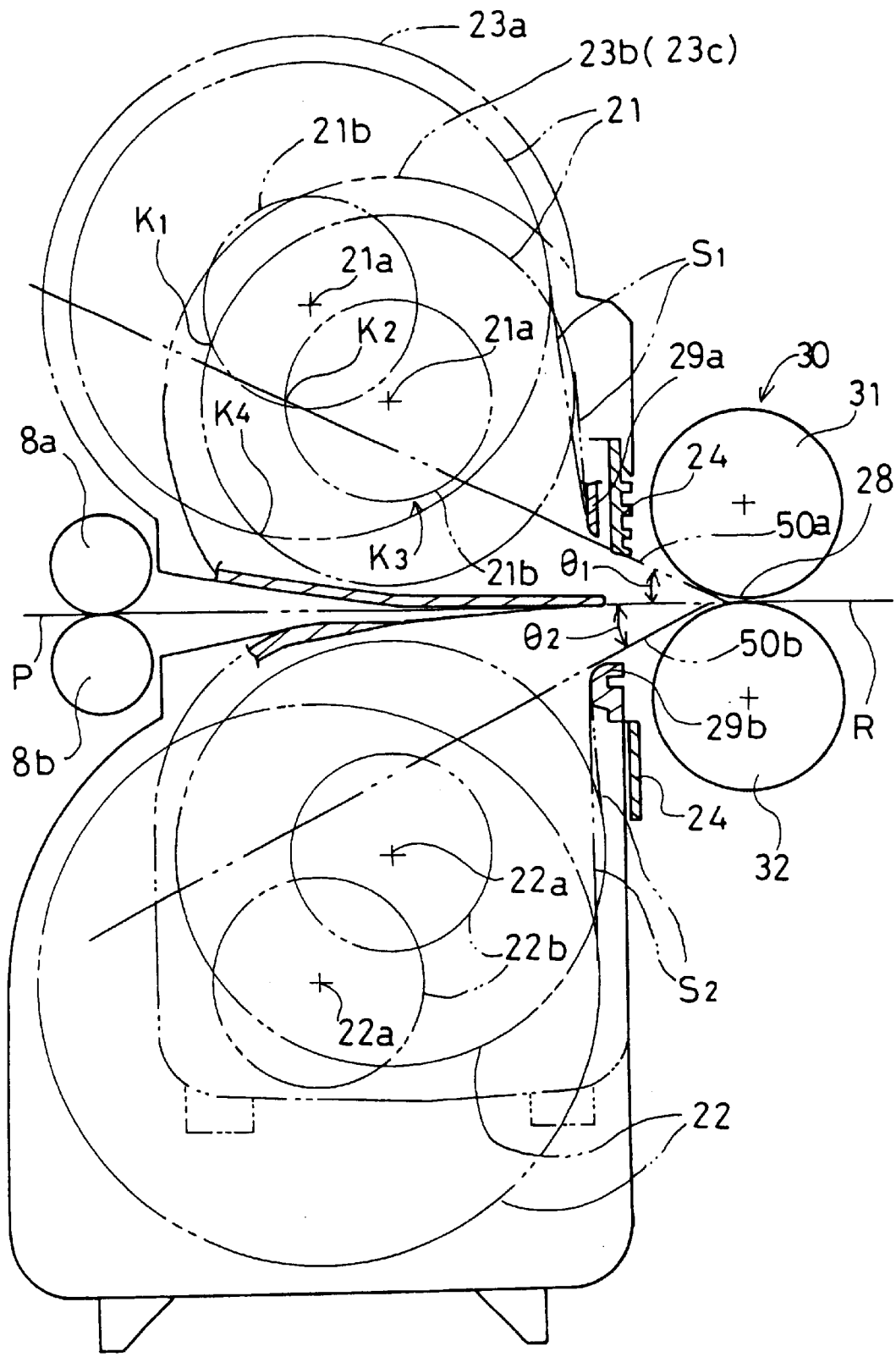
FIG. 12 is a side explanatory diagram showing a state where a large and a small size sheet cassettes are set.

On the side where the sheets are drawn from the sheet rolls 21, 22 (the paper feed-out port 27d side), a pair of sheet guide portions 29a, 29b are disposed between a pinching portion 28 of both pinch rollers 31, 32 (see FIGS. 6 and 12). The sheets S1, S2 to be drawn from the upper and lower sheet rolls 21, 22 in the housing 23 of each sheet cassette 20 are drawn from the peripheries apart in up and down direction from the centers of reels 21a, 22a of each sheet roll 21, 22. The sheets S1, S2 are curled at the tips (slide contact portions) of the sheet guide portions 29a, 29b and contact the peripheries of the pinching side of the pinch rollers 31, 32. In this case, the centers of reels 21a, 22a of the sheet rolls 21, 22 are at positions which are apart in the up and down direction from lead lines 50a, 50b of the sheets connecting each tip (slide contact portion) of the sheet guide portions 29a, 29b and the peripheries of the pinching side of the pinch rollers.

With this structure, either when the diameter of the sheet rolls 21, 22 are large such as soon after starting using them or when the diameter of the sheet rolls 21, 22 become small by using them, so that the sheets are drawn near the peripheries of the reels 21b, 22b of the sheet rolls 21, 22, the sheets S1, S2 drawn from the peripheries of the sheet rolls 21, 22 are led to the pinching portion 28 along the lead lines 50a, 50b of the sheets formed by constant pinch angles θ1, θ2, after the outer surfaces of sheets S1, S2 are surely slid and curled at the tips (slide contact portions) of the sheet guides 29a, 29b.

Therefore, regardless of the size of initial winding diameter of the sheet rolls 21, 22 or the change of the winding diameter of the sheet rolls 21, 22 through the use of the sheets, the pinch angles θ1, θ2 become constant and thus the laminating action is maintained constant. As shown in FIG. 12, the centers of reels 21a, 22a of the sheet rolls 21, 22 accommodated in the small housing 23b for A4-size paper or the small housing 23c for A6-size paper are positioned downstream of the feed direction so that the centers of reels 21a, 22a of the sheet rolls 21, 22 get closer to the pinching portion 28, by extension and to the sheet guide portions 29a, 29b than the centers of reels 21a, 22a of the sheet rolls 21, 22 accommodated in the large housing 23a for A3-size paper. Conversely, the centers of reels 21a, 22a of the sheet rolls 21, 22 accommodated in the large housing 23a for A3-size paper are positioned upstream of the feed direction so that the centers of reels 21a, 22a of the sheet rolls 21, 22 get further away from the sheet guide portions 29a, 29b than the centers of reels 21a, 22a of the sheet rolls 21, 22 accommodated in the small housing 23b for A4-size paper or the small housing 23c for A6-size paper.

To meet this structure, the housing 23b for A4-size paper or the housing 23c for A6-size paper is mounted on the attachment 60 described later.

With this structure, the sheet cassette accommodating the sheet rolls having large initial diameter and the sheet cassette accommodating the sheet rolls having small initial diameter can be mounted so as to generate the same laminating action between them.

As shown in FIGS. 4, 7, 10, and 11, the attachment 60 has the same plan shape as that of the housing 23a for A3-size paper. The attachment 60 is fit into the cassette accommodating portion 4 which has no top surface, and is structured so that the housing 23b for A4-size paper and the housing 23c for A6-size paper which are smaller than the housing 23a for A3-size paper can be mounted to each predetermined position. This will be further described in detail. The attachment 60 is formed in substantially L-shape in side cross section by a bottom plate 60a, on which the housing 23 is mounted, and a wall plate 60b that stands from one side of the bottom plate 60a (the upstream of the paper P in this embodiment), and is integrally formed by an injection molding method using synthetic resin so that the block portion 60c for positioning the attachment 60 protrudes upwardly from one end of a longitudinal direction of the bottom plate 60a and the wall plate 60b (the right edge of the paper P in this embodiment). The wall plate 60b and the block portion 60c are provided with support portions 60d, 60d for preventing the housing 23 set in the attachment 60 from falling down to the upstream side of the feed direction of the paper P. Further, a plurality of guide recesses 62 and positioning protrusions 63 are located at predetermined positions.

Figure 8:
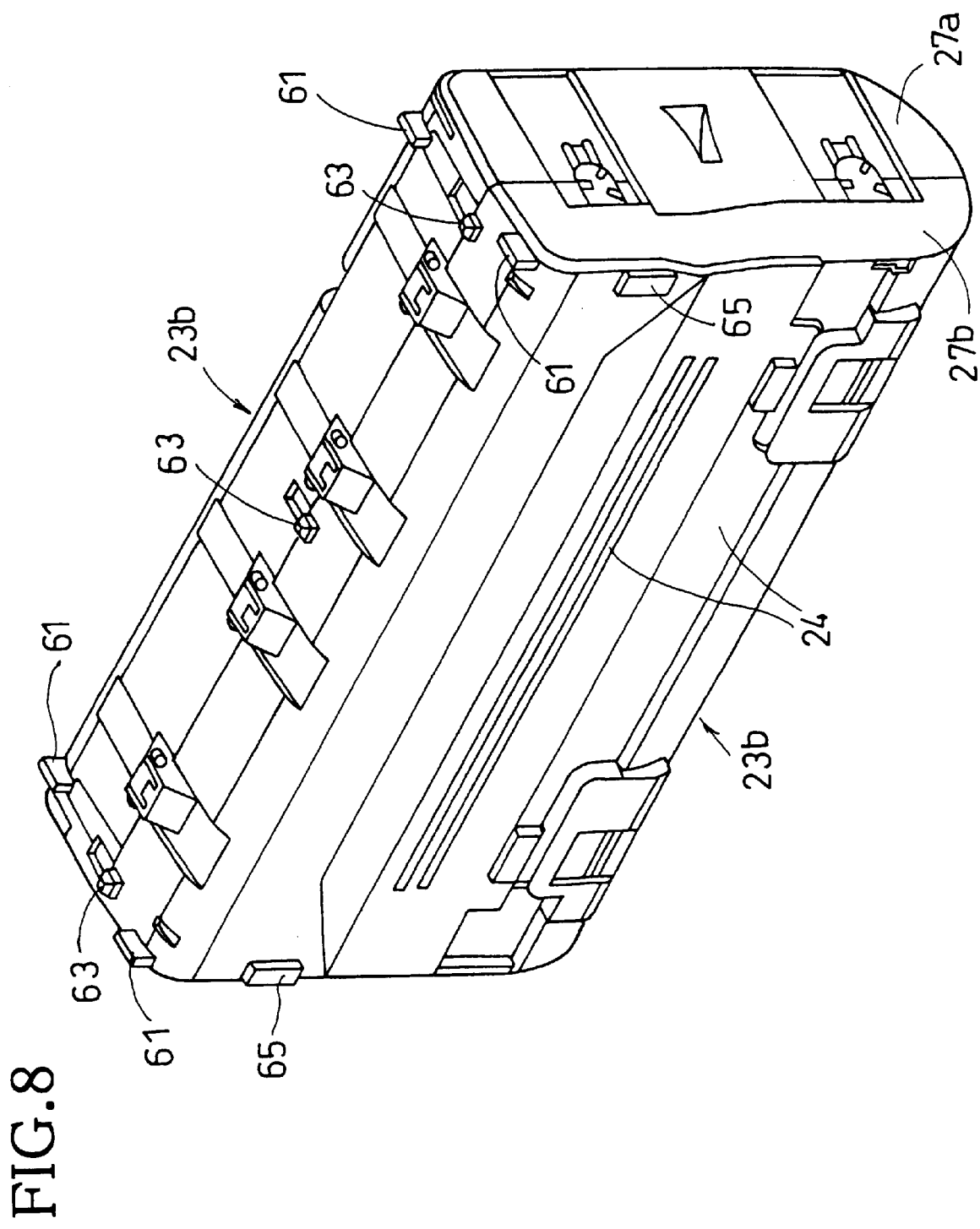
FIG. 8 is a perspective view of a housing of a sheet cassette for A4-size paper when viewed from the bottom.
Figure 9:
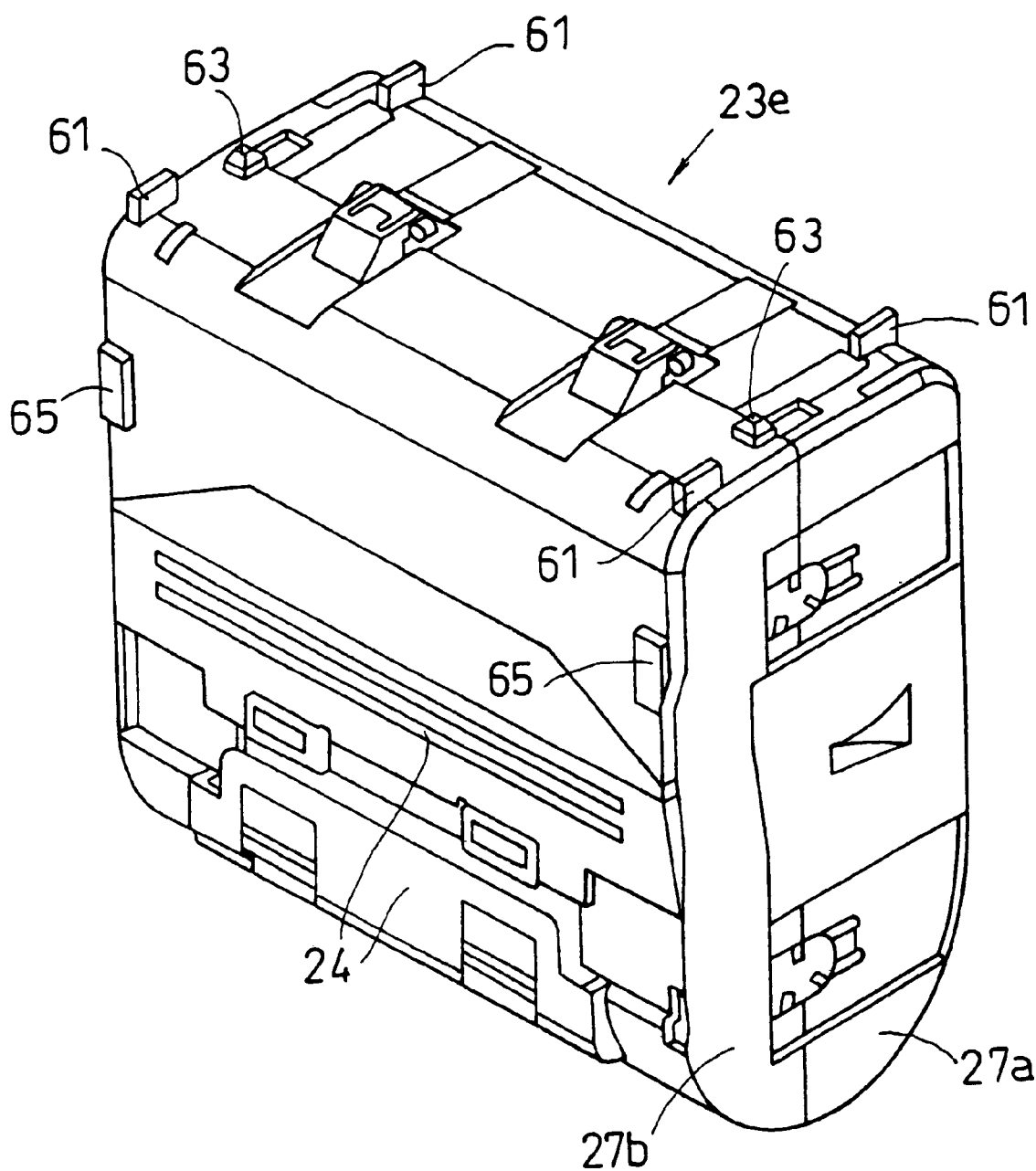
FIG. 9 is a perspective view of a housing of a sheet cassette for A6-size paper when viewed from the bottom.

When the housing 23 is set in the cassette accommodating portion 4 or the attachment 60, guide protrusions 61 that protrude from right and left end portions of the bottom surface of the housing 23 fit in the guide recesses 62 which are perforated or recessed in the bottom of the cassette accommodating portion 4 and the attachment 60. Further, truncated pyramid positioning protrusions 63 that protrude from the bottom surface of the housing 23 fit in the positioning recesses 64 which are perforated and recessed in the bottom of the cassette accommodating portion 4 or the attachment 60. (See FIGS. 4 through 10. FIGS. 8 and 9 show the sheet cassettes in perspective views so that the housings 23b and 23c can be seen.)

With the structure described above, in this invention, the attachment 60 is provided with engagement portions for mounting the sheet cassette 23b or 23c each having a different width on each predetermined position, so that the sheet cassette 23b or 23c each having the different width, can be easily fit at the predetermined position of the attachment 60. Further, the attachment 60 is accommodated in the cassette accommodating portion 4 in the laminating apparatus 1, whereby the sheet cassette housing 23b or 23c can be easily accommodated in the cassette accommodating portion 4 via the attachment 60.

Further, the bottom plate 60a of the attachment 60 on which either sheet cassette housing 23b or 23c is mounted (see FIGS. 10 and 11) and is formed in an appropriate height H1 as shown in FIG. 7. Therefore, when the sheet cassette housing 23b or 23c is accommodated in the cassette accommodating portion 4 via the attachment 60, the position of the laminate target insertion port 27c and the laminate target feed-out port 27d of the sheet cassette housing 23b or 23c in the height direction can be positioned at the same height as the position of the laminate target insertion port 27c and the laminate target feed-out port 27d of the sheet cassette housing 23a for A3-size paper in the height direction. Accordingly, the paper P can pass through the same supply path as that in the sheet cassette housing 23a for A3-size paper when the sheet cassette housing 23b or 23c is accommodated in the cassette accommodating portion 4 via the attachment 60.

Consequently, in the laminating apparatus for A3-size paper 1, the paper P can be laminated using the sheet cassette housing 23b or 23c which can not be previously set in the laminating apparatus for A3-size paper 1.

Further, in this invention, a sheet cassette housing whose width, thickness and height are smaller than that of the large sized sheet cassette housing, like the sheet cassette housing 23b or 23c, can be accommodated in the cassette accommodating portion 4 of the laminating apparatus 1 via the attachment 60. Accordingly, the sheet cassette can be changed according to the size of paper P, so that the yields of the sheets S1, S2 can be increased. Furthermore, in the laminating apparatus for A3-size paper, the paper P can be laminated using the sheet cassette housing 23b or 23c which can not be previously set in the laminating apparatus for A3-size paper.

In addition, in this invention, a sheet cassette housing whose width, thickness and height are smaller than that of the large sized sheet cassette housing 23a, like the sheet cassette 23b or 23c, can be accommodated in the cassette accommodating portion 4 of the laminating apparatus 1 via the attachment 60. Accordingly, the sheet cassette can be changed according to the size of paper P, so that the yields of the sheets S1, S2 can be increased.

Further, the time and trouble involved in developing a new small sheet cassette housing which has the width, thickness and height to just fit in the laminating apparatus for A3-size paper 1 can be saved. Furthermore, the problem that the operating costs become expensive because consumers buy sheet cassettes for each laminating apparatus can be avoided.

There is a desire to laminate A3, A4, and A6-size paper. To respond to this, the upper and lower sheets S1, S2 to be accommodated in the housing 23 of the sheet cassette 20 are changed in their width. When the number of times that all sheets can laminate paper is set to substantially the same without concern for the size of the sheets, the roll length when the sheets S1, S2 for laminating a large size paper are rolled is long. Thus, by extension, the diameter of the rolls is large. Therefore, a dimension along the feed direction of the laminate target of the housing 23 of the sheet cassette 20 (hereinafter referred to as a depth) is set large for the housing for large size paper and is set small for the housing for small size paper.

In such a case, the sheet cassette 20 needs to be detachably disposed between the pair of paper feed rollers and the pair of pinch rollers. Therefore, the distance between the pair of paper feed rollers 8a, 8b and the pair of pinch rollers 31, 32 needs to be set long such that the paper feed rollers 8a, 8b and the pinch rollers 31, 32 are fixedly disposed as in the prior art. Consequently, there arose the problem that the small size paper cannot be laminated.

On the other hand, when the distance between rollers is set short so that the small size paper can be laminated, the diameter of the sheet rolls 21, 22 to be accommodated in the sheet cassette 20 need to be small. In this case, there arose the problem that the large size paper P can be laminated extremely few times, and the sheet cassette 20 or the sheet rolls 21, 22 in the sheet cassette 20 need to be frequently changed.

Therefore, in the housing 23 for laminating A3-size paper P, the dimension in the feed direction of the paper P (the depth) is enlarged. On the other hand, as shown in FIGS. 3 through 6, in the front case 27a, a depressed portion 27e, which is formed by depressing the paper insertion port 27c toward the paper feed-out port 27d, is formed. In a state where the sheet cassette 20 is set, as described later, the paper feed rollers 8a, 8b enter the depressed portion 27e via the swing mechanism 3. On the other hand, in a state where the sheet cassette 20 for small size paper (A4 or A6) is set, the paper feed rollers 8a, 8b are moved closer to the paper insertion port 27c so that the distance between rollers becomes short. The sheet cassette 20 is structured so that the sheet cassette 20 can be detachably mounted in the same laminating apparatus even when each sheet cassette 20 has different dimension.

Further, when the housing 23b for A4-size paper and the housing 23c for A6-size paper is set on the attachment 60 so that the one end surface of the housing contacts the block portion 60c of the attachment 60 (see FIGS. 10 and 11), the sheets S1, S2 are fed out so that the right edge of the paper P to be fed becomes a reference side of the laminating operation.

In the condition described above, the size of the paper P which can be laminated can be displayed on a display unit 71, such as a liquid crystal panel, provided on the laminating apparatus 1, by detecting portions 65, 65 which project from both ends of the side surface of the one longitudinal direction of the housings 23a, 23b, and 23c using a sensor 72, such as a limit sensor, disposed at a predetermined position in the laminating apparatus 1.

The sheet rolls 21, 22 are the same as the prior art in that they are formed by winding elongated sheets in a roll shape, however, the material of the sheets is greatly different from the prior art. That is, in FIG. 6, the sheet S1 rolled as the sheet roll 21 disposed at the upper portion of the drawing includes a transparent resin film layer as a base and an adhesive layer laminated on one surface of the base. PET (polyethylenetelephthalate) is practically used as the film layer serving as the base of the sheet S1.

As shown in FIG. 6, the sheet S2 rolled as the sheet roll 22 which is disposed at the lower portion is formed of a separation type sheet, and more specifically the sheet S2 has paper as a base, and a material having separativeness, such as paraffin or the like, is impregnated into or laminated on the base. The sheet S1 has such an adhesiveness property that the adhesive layer of the sheet S1 is easily peeled off. The sheet S2 is not limited to the separation type sheet having paper as a base, and it may be a sheet using resin having separativeness as a base.

The sheet rolls 21, 22 are rotatably supported within the housing 23.

The sheets S1, S2 are drawn out from the paper feed-out port 27d of the housing 23 so that the adhesive surface and the separation face confront each other.

The sheet cassette 20 is freely detachably mounted to the cassette accommodating portion 4 in the laminating apparatus 1 or the attachment 60 which is freely detachably mounted to the cassette accommodating portion 4. In a state where the large housing 23a for A3-size paper is placed on a bottom plate 4a of the cassette accommodating portion 4 or the state where the housing 23b for A4-size paper or the housing 23c for A6-size paper is placed on the bottom plate 60a of the attachment 60, the paper insertion port 27c is located on an extension line of the feed path (supply path) of the paper P, that is, on a straight line connecting a pinching portion of the paper P of the paper feed rollers 8a, 8b and a pinching portion of the pinch rollers 31, 32, so that the paper P supplied from the paper supply tray 11 is smoothly fed into the sheet cassette 20 (see FIG. 4).

In a state where the sheet cassette 4 is not placed in the cassette accommodating portion 4, the shutter 24 covers the paper feed-out port 27d. In a state where the sheet cassette 20 is placed in the cassette accommodating portion 4, the shutter 24 is evacuated from the paper feed-out port 27d, so that the paper P can be fed out to the laminating processor C.

As shown in FIGS. 2, 3, 4, and 6, the laminating processor C is provided with pinch roller means 30 that includes the upper and lower rollers 31, 32. The pinch roller means 30 is supported so that the pinch position thereof faces the paper feed-out port 27d of the sheet cassette 20 placed in the cassette accommodating portion 4.

The lower roller 32 rotatably supported by right and left chassis 1a' is a driving roller rotated by driving means such as a motor (not shown). On the other hand, the upper roller 31 is a driven roller which is idle, and is rotated in contact with the lower driving roller 32. In the laminating apparatus 1 of the invention, the upper driven roller 31 is structured to contact/release from the lower roller 32 in unison with the movement of the swing mechanism 3 of the paper feed roller 8a, 8b, as shown in FIG. 3.

Next, a structure of the swing mechanism 3 will be described with reference to FIGS. 2 and 3.

The paper feed rollers 8a, 8b are axially fixed at a halfway position in the vertical direction of a pair of right and left main swing arms 34, 34 pivotally supported by lower pivot pins 33 affixed to the lower portion of the right and left of chassis 1a', 1a'. A paper sensor 35 for detecting the front edge of the paper P to be fed is mounted to a connection plate 34a that connects both main swing arms 34, 34. Further, guide pins 38, 38 that laterally project from a pair of right and left cassette holding support arms 37, 37 whose base ends are pivotably supported by upper pivot pins 36 mounted on upper portions of right and left chassis 1a, 1a slidably engage into each slit 39 that elongates in the vertical direction and is perforated in forepart of the right and left main swing arms 37, 37. A press roller 40 for pressing from above the upper portion of the paper feed out side of the housing 23 of the sheet cassette 20 inserted in the cassette accommodating portion 4 is rotatably mounted to the front end of the right and left cassette holding support arms 37, 37.

Further, both ends of the upper rollers 31 are rotatably supported by a pair of roller arms 41, 41 rotatably supported by pins 42 provided at the front end of the pair of right and left cassette holding support arms 37, 37. One end of each torsion spring 44 supported by each projecting piece 43 which is formed by cutting and bending is caught by the cassette holding support arm 37, and other end of each torsion spring 44 is engaged with the roller arm 41 so as to urge the roller arm 41 downward.

The housing 23a for A3-size paper is immediately set in the cassette accommodating portion 4, the attachment 60 in which the housing 23b for A4-size paper or the housing 23c for A6-size paper is set in advance the cassette accommodating portion 4, or first the attachment 60 is set in the cassette accommodating portion 4 and then the housing 23b or 23c is set therein. After that, an operator holds the front end of the cassette holding support arm 37 and rotates it to the paper feed-out side which is the upper portion of the housing 23 so that the housing 23 is pressed so as not to be lifted up by the press roller 40. The right and left cassette holding support arms 37, 37 are engaged with an engagement portion (not shown) of the chassis 1a' or the outer housing 1a while keeping the posture of the cassette holding support arms 37, 37. At this time, the upper roller 31 mounted on the roller arms 41, 41 is urged against the lower roller 32 by an urging force from the torsion springs 44 (see a state of a portion indicated with a solid line in FIG. 3).

Further, when the housing 23 is set under the pressure, the right and left main swing arms 34, 34 are swung in the right direction in FIG. 3 and the upper and lower paper feed rollers 8a, 8b which are paper feeding means and are mounted to the main swing arms 34, 34 move closer to the paper insertion port 27c, which is the laminate target leading side of the sheet cassette 20, by a sliding connection relationship of the cassette holding support arms 37, 37 and the slits 39. In this state, a tip 45a of a detecting arm 45 extending from the lower paper feed roller 8b toward the upstream of the paper feed direction detects the condition of the sheet cassette 20 by touching a sensor 46, such as a limit switch, which is provided to the laminating apparatus 1, and thus the condition of the sheet cassette 20 can be communicated to the operator via the display unit.

On the other hand, when the right and left cassette holding support arms 37, 37 are swung in the upper left direction in FIG. 3 so that the housing 23 becomes free from the pressure, the upper roller 31 mounted on the roller arms 41, 41 at its front ends is released from the lower roller 32, the main swing arms 34, 34 are also swung in the left direction, and the upper and lower paper feed rollers 8a, 8b which are the paper feed means move to a distance from the paper insertion port 27c which is the laminate target leading side of the sheet cassette 20 (see the state indicated with a double dashed chain line in FIG. 3).

The pinch roller means 30 described above functions to pinch the paper P fed into the gap between the sheet S1, S2, which are supplied from the sheet cassette 20 mounted in the sheet supply unit B, together with the sheets S1, S2 and feed out the paper and sheets while joining them. The paper P pinched between the sheets S1, S2 supplied from the sheet cassette 20 is fed out while pinched by the pinch roller means 30, whereby the paper P is laminated by the sheets S1, S2 to thereby obtain a laminated member R.

The cutting unit D is provided with a first cutting mechanism (not shown) for cutting the laminate R fed out from the laminating processor C in the Y direction, and a cutter blade 66 (see FIG. 6) that is the second cutting mechanism for cutting the laminate R in the X direction, which is the direction perpendicular to the feed direction of the laminate R.

A spiral groove is formed at the center of a circular plate type cutter blade of the lateral cutting mechanism. Further, a spiral shaft (not shown) is provided to the chassis 1a', and the spiral shaft is engaged with the spiral groove of the cutter blade. The spiral shaft is rotatably mounted on the chassis 1a', and is connected to a motor (not shown). By rotating the motor, the spiral shaft is rotated and the cutter blade engaged with the spiral shaft is moved to cut the laminate R.

The cutter blade 66 of the second cutting mechanism serves to cut out the side edge portion (salvage) of the laminate R when the width of the sheets S1, S2 is excessively larger than the paper P.

A laminating operation in the above-described structure will be described. First, the sheet cassette 20 and housing 23a for A3-size paper is directly set in the cassette accommodating portion 4 or the attachment 60 in which the small sheet cassette 20 and housing 23b, 23c for A4 or A6-size paper is set in advance in the cassette accommodating portion 4.

When the sheet cassette 20 is mounted, the tip portions of the sheets S1, S2 of the sheet cassette 20 are mutually adhesively attached to each other in advance. Then, in this state, the cassette holding support arm 37 is swung in the upward direction of the housing 23, the housing 23 is pressed by the pressing roller 40, and the tip portions of the sheets S1, S2 are pinched by the pinch rollers 31, 32. At this time, the distance between the pair of the upper and lower rollers 8a, 8b and the pair of the pinch rollers 31, 32 can be shortened because the main swing arms 34, 34 are rotated and moved closer to the front side of the housing 23, and the upper and lower paper feed rollers 8a, 8b, which are the paper feeding means, are moved closer to the front surface of the housing 23.

When the standby work is completed, the paper P to be laminated is put on the paper supply tray 11. Here, at least the width of the sheets S1, S2 are larger than the width of the paper P. When the paper P is fed between the paper feed rollers 8a, 8b along the sheet guide plate 12a, 12b, the paper P is inserted into the sheet cassette 20 from the paper insertion port 27c of the sheet cassette 20 mounted in the sheet supply unit B, sandwiched between the sheets S1 and S2 and fed out from the paper feed-out port 27d to the laminating processor C while guided by the sheet guide plates 25a, 25b and the resin spring 26. The paper P which is fed out together with the sheets S1, S2 is pinched by the pinch roller means 30 to laminate the paper P with the sheet S1, S2.

Figure 13:
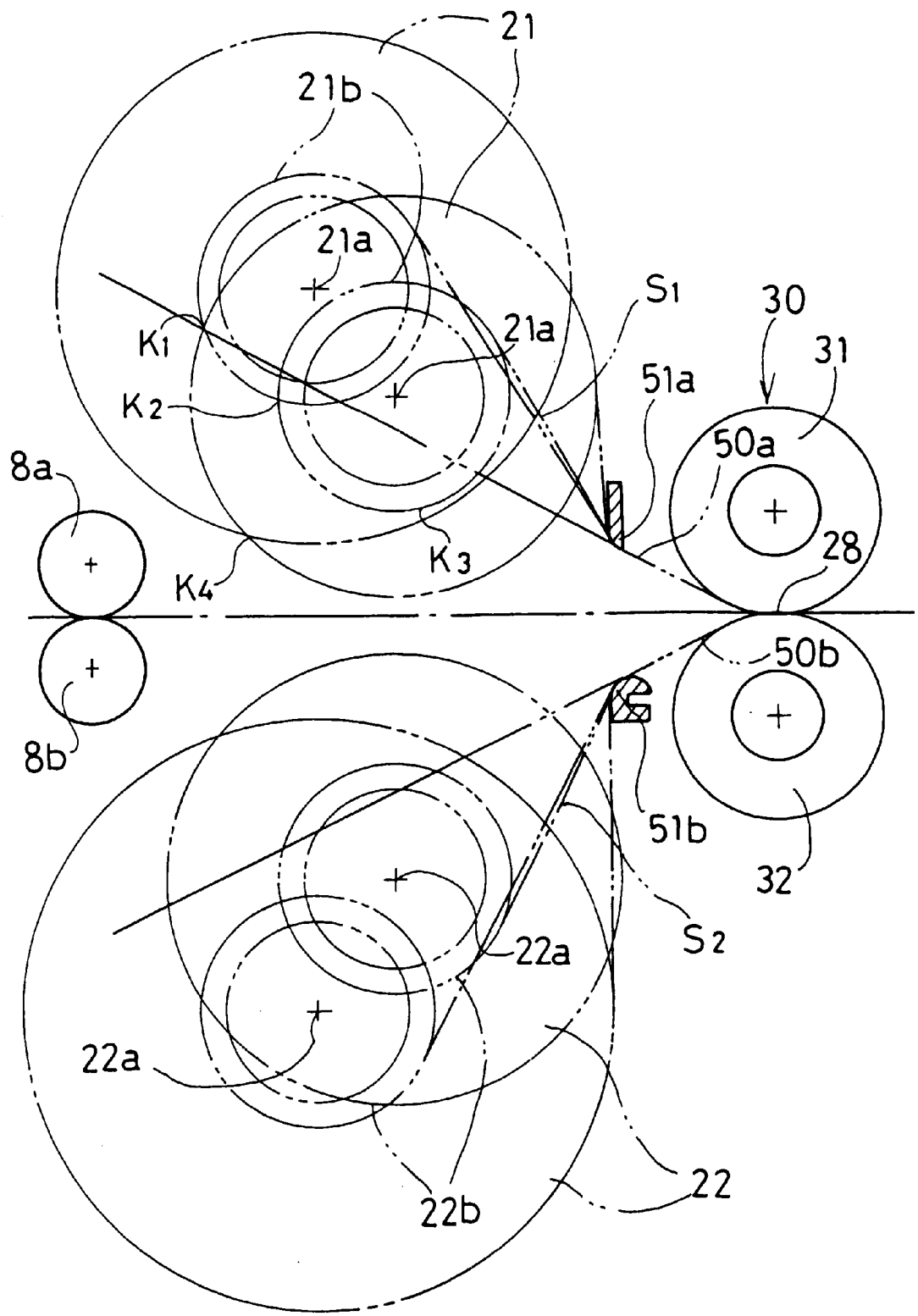
FIG. 13 is a side explanatory diagram showing a state where sheet rolls having a large winding diameter are set and a state where sheet rolls having a small winding diameter are set.

FIG. 13 is an embodiment that the pair of upper and lower sheet rolls 21, 22 are directly disposed in the sheet supply unit B without using the sheet cassette 20. The pair of sheet guide portions 51a, 51b are disposed between the centers of reels 21a, 22a of the sheet rolls 21, 22 and the pinching portion 28 of the pinch rollers 31, 32 on the main body of the laminating apparatus.

The sheets S1, S2 to be drawn from the sheet rolls 21, 22 are drawn from the peripheries apart in up and down directions from the centers of reels 21a, 22a of each sheet roll 21, 22. The sheets S1, S2 are curled at the tips (slide contact portions) of the sheet guide portions 51a, 51b and contact the peripheries of the pinching side of the pinch rollers 31, 32. In this case, the centers of reels 21a, 22a of the sheet rolls 21, 22 are disposed at positions which are apart in the up and down directions from lead lines 50a, 50b of the sheets) connecting each tip (slide contact portion) of the sheet guide portion 51a, 51b and the peripheries of the pinching side of the pinch rollers.

With this structure, either when the diameter of the sheet rolls 21, 22 are large, such as soon after starting using them, or when the diameter of the sheet rolls 21, 22 become small by using them so that the sheets are drawn near the peripheries of the reels 21a, 22a of the sheet rolls 21, 22, the sheets S1, S2 drawn from the peripheries of the sheet rolls 21, 22 are led to the pinching portion 28 along the lead lines 50a, 50b of the sheets formed by constant pinch angles θ1 and θ2 after the outer surfaces of sheets S1, S2 are surely slid and placed at the tips (slide contact portions) of the sheet guides 51a, 51b.

Further, the centers of reels 21a, 22a of the sheet rolls 21, 22, having a large winding diameter under service conditions (in pristine condition), are preferably disposed upstream of the feed direction so that the centers of reels 21a, 22a of the sheet rolls 21, 22 are more distant from the sheet guide portions 51a, 51b than the centers of reels 21a, 22a of the sheet rolls 21, 22 having a small winding diameter in the pristine condition (see FIG. 13). According to these structures, as in the case where the sheet rolls are mounted using the sheet cassette 20, the pinch angles θ1, θ2 become constant and thus the laminating action is maintained constant regardless of the size of initial diameters of the sheet rolls 21, 22 or the changes of the diameters of the sheet rolls 21, 22 through the use of the sheets.

Figure 14:
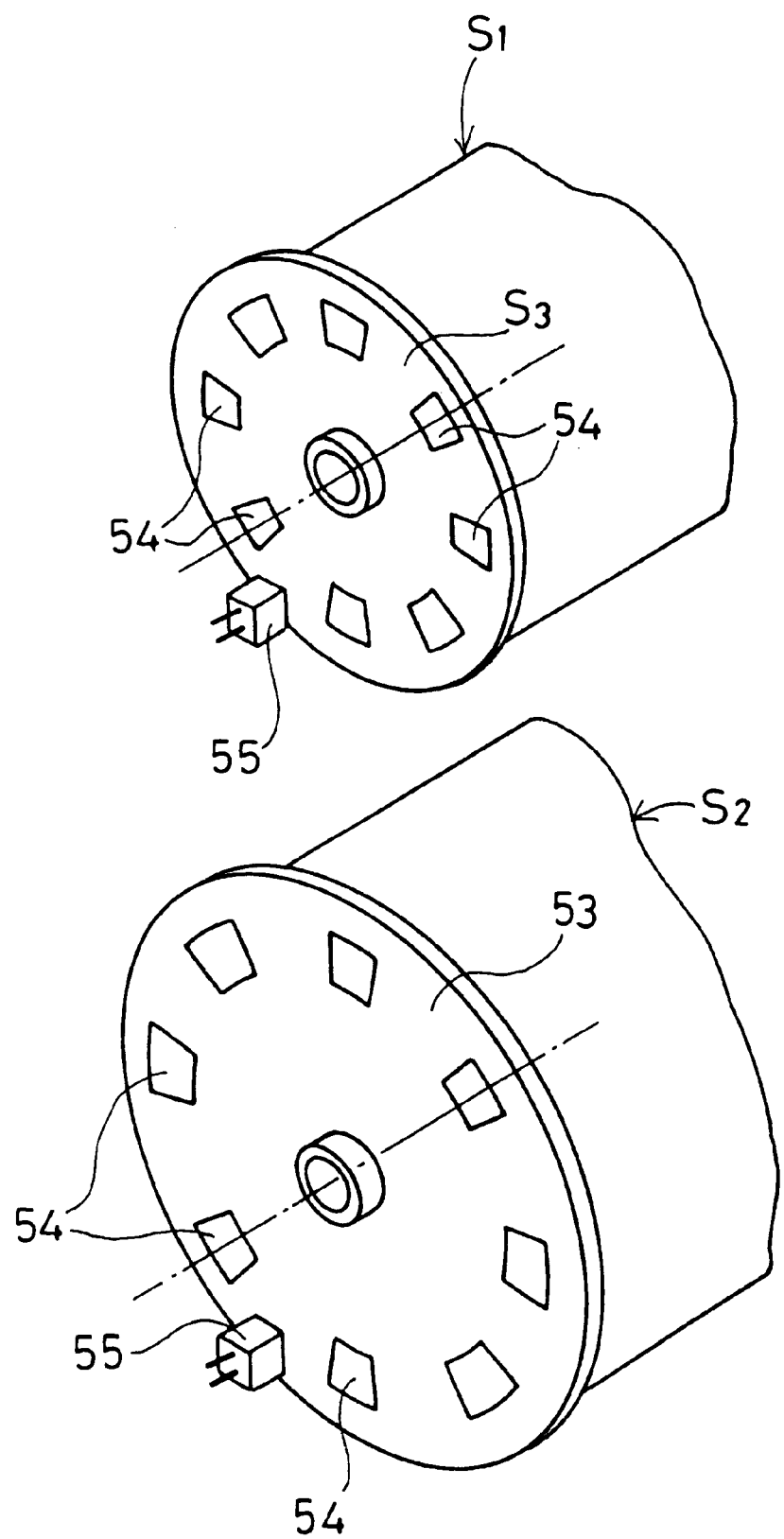
FIG. 14 is partially perspective views showing arrangements of light sensors with respect to marks on outer surfaces of flange portions of the sheet rolls.

As shown in FIG. 14, on outer surfaces of flange portions 53, 53 of reels of the sheet rolls 21, 22 which are directly mounted on the apparatus and are accommodated in the sheet cassette 20, marks 54 are given by printing or the like along the circumference at appropriate intervals. The laminating apparatus 1 is structured to detect data about the sheets, such as a type, width, winding diameter of the sheets S1, S2 wound around the reels by the type of the marks 54 using a light flex type light sensor 55 (a light type encoder may be used) provided to the main body of the laminating apparatus 1. In this case, if the light sensor 55 is disposed at a position where paths of rotation of the marks 54, 54 on the flange portions 53, 53 of the sheet rolls having a large winding diameter and a small winding diameter overlap each other, for example, at a position within an area enclosed with K1, K2, K3, and K4 in FIGS. 12 and 13, a plurality of sheet rolls, which each have different diameters or whose centers of reels are located at different positions, can be identified (detected). Therefore, there is an effect that the cost of manufacturing the laminating apparatus can be reduced.

In the laminating apparatus 1 of the embodiment, the sheet S1 has the transparent resin film layer F as the base, the adhesive layer T is laminated on one surface thereof. When the sheet S2 is the separation type sheet layer, the sheet S1 including the film layer F and the adhesive layer T is pressed against the surface of the paper P. The film layer F is adhered to the surface of the paper P by the adhesive layer T. On the other hand, the sheet S2 is pressed against the back surface of the paper P, however, the sheet S2 does not adhere to the paper P because the sheet S2 has only the separation type sheet layer.

The width of the sheets S1, S2 is larger than the width of the paper P, and thus the sheets S1, S2 are protruded from the paper P in the width direction of the paper P. The adhesive layer T of the sheet S1 and the separation type sheet layer of the sheet S2 are adhesively attached to each other at the protruded portions, and the sheets S1, S2 and the paper P are substantially integrated into the laminate R.

Thereafter, the laminate R is fed out to the cutting unit D.

In the laminating apparatus 1 of the embodiment, the first cutting mechanism cuts the protruded extra edge portions of the sheet S1, S2 to obtain a proper edge width when the width of the sheets S1, S2 is excessively larger that the width of the paper P. Further, when the feed-out of the laminate R progresses and the laminate R reaches a predetermined position in the Y direction of the paper P, that is, at the time when a predetermined position of the laminate R reaches the cutting position of the second cutting mechanism, the cutting blade 66 the laminate R is cut by the second cutting mechanism in the X direction.

Figure 15A:
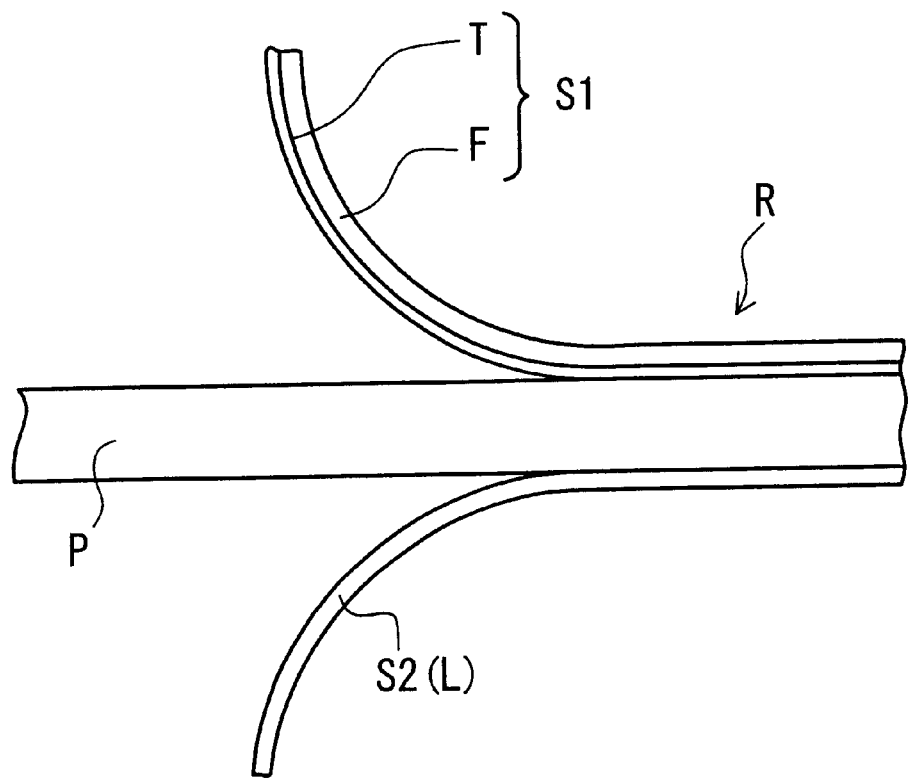
FIG. 15(a) is a diagram showing a layer structure of sheets laminated by the laminating apparatus of an embodiment of the invention.

In the laminate R thus formed, the transparent film layer F is laminated on the surface of the paper P, the separation type sheet layer L (FIG. 15(a)) exists on the back surface of the paper P in a non-adhesion state, the edge of the paper P is surrounded by the sheets S1, S2 and the transparent film layer F and the separation type sheet layer L adhere to each other at the protruded portions thereof while they are easily peeled off from each other.

Figure 15B:
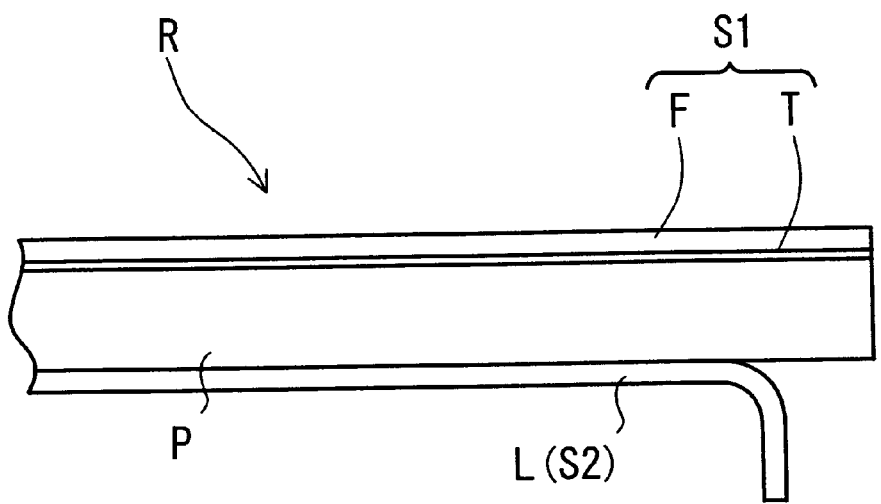
FIG. 15(b) is a diagram showing a method of using a laminate.

When the laminate R thus obtained is adhesively attached to the wall or the like, the separation type sheet layer L on the back surface of the laminate R is peeled off as shown in FIG. 15(b). As a result, the adhesive layer T of the sheet S1 is exposed to the surrounding portion of the paper P. Accordingly, the laminate R can adhere to a desk or the like.

As another embodiment, the same sheet as the above embodiment (the laminate sheet of the resin film layer F and the adhesive layer T) is used as the sheet S1, and a magnetic sheet is used as the sheet S2. As an embodiment of the magnetic sheet, a sheet M having magnetism as a base and the adhesive layer T is laminated on one surface of the sheet M as shown in FIG. 15. The sheet having magnetism may be formed by kneading magnetic material into rubber or synthetic resin to magnetize the sheet.

Figure 16A:
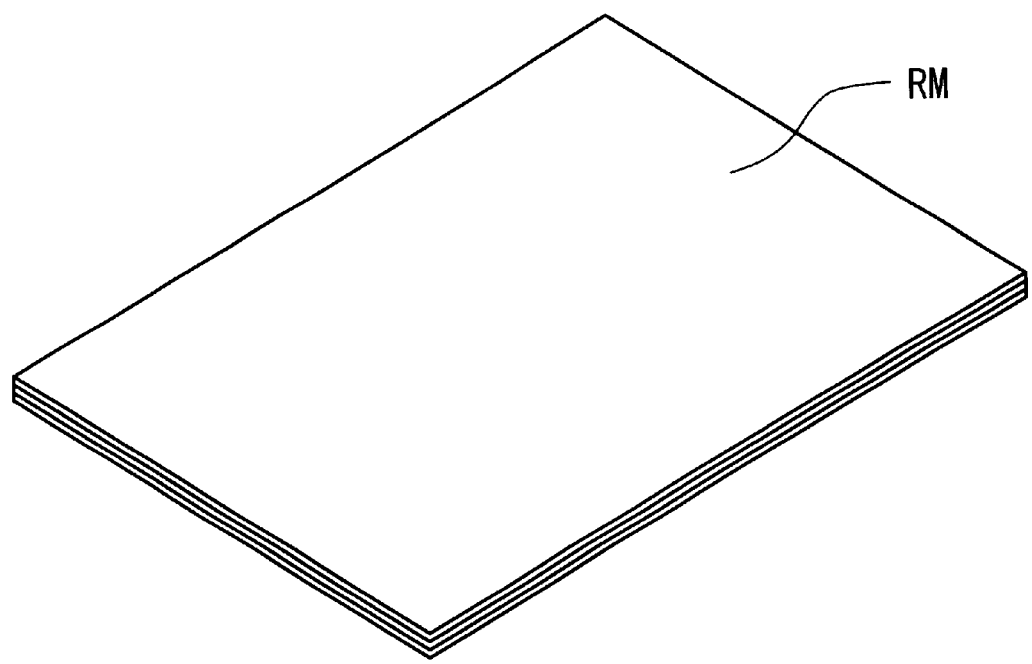
FIG. 16(a) is a perspective view of a laminate made by another embodiment.
Figure 16B:
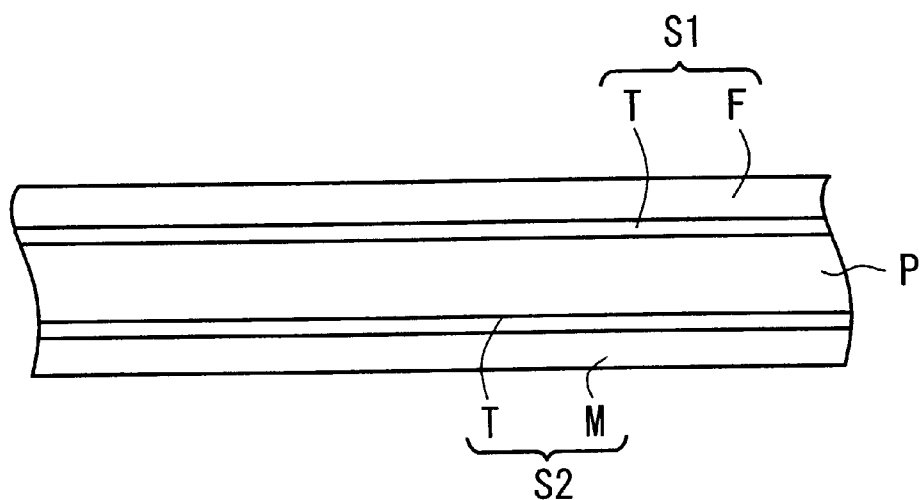
FIG. 16(b) is an enlarged view showing a layer structure of the laminate.

The laminate sheet S1 composed of the resin film layer F and the adhesive layer T and the magnetic sheet S are wounded in a roll shape and accommodated in the housing 23 to fabricate a sheet cassette 20, and then the sheet cassette 20 thus fabricated is mounted in the sheet supply unit B. Subsequently, the same steps as described above are carried out to obtain a laminate RM having the layer structure as shown is FIGS. 16(a) and 16(b).

The surface of the laminate RM is protected by a transparent resin film layer F, and the magnetic layer M is laminated on the back surface of the laminate RM. Accordingly, the laminate RM can be magnetically attached to an iron plate or the like.

What is claimed is:

1. A sheet cassette for use in a laminating apparatus including a laminate processor in which a pair of upper and lower pinch rollers are rotatably disposed, comprising:

a housing having an accommodating area;

a pair of upper and lower sheet rolls that are sheets wound in a roll shape and that are accommodated in the housing;

an insertion port formed at a front side of the housing, at which a laminate target is fed into a gap between the sheet rolls;

a feed-out port formed at a back side of the housing, at which the laminate target, fed through the insertion port, is fed to the laminate processor outside of the housing together with the sheets fed out from the sheet rolls, respectively;

a pair of sheet guide portions disposed near the feed-out port, that guide the sheets out of the housing, wherein the sheets are drawn from peripheries of the upper and lower sheet rolls that are apart from a center of each upper and lower sheet roll in an upper and a lower direction so that outer surfaces of each sheet slide and contact the sheet guide portions, and the centers of each sheet roll are disposed at positions apart from lead lines of the sheets further drawn to connect peripheries of a pinching side of each pinch roller and slide contact portions of the sheet guides.

2. The sheet cassette as claimed in claim 1, wherein the center of each sheet roll is positioned so as to be apart from the sheet guide portions in proportion to a size of the winding diameter of the respective sheet.

3. The sheet cassette claimed in claim 1, further comprising an attachment that is detachably attached to the housing, accommodating the sheet rolls, having a smaller winding diameter than that of a maximum sized housing used in the laminating apparatus so that the center of the sheet roll is at a position closer to the pinch rollers as a size of the winding diameter of the sheet is smaller when the sheet cassette is mounted in the laminating apparatus.

4. The sheet cassette claimed in claim 3, wherein the attachment further comprises engagement portions capable of mounting various housing, each having different widths.

5. The sheet cassette claimed in claim 1, further comprising a pair of upper and lower guide plates that are provided in the housing so as to extend from the insertion port to the feed-out port, and that form a guide path for guiding the laminate target fed from the insertion port to the feed-out port.

6. The sheet cassette claimed in claim 5, wherein the lower guide plate is shorter than the upper guide plate, and the lower guide plate is provided with an urging member for pressing the laminate target being fed against the upper guide plate.

7. The sheet cassette claimed in claim 1, wherein the feed-out port is provided with a shutter member for opening/closing the feed-out port.

8. The sheet cassette claimed in claim 1, wherein the shutter member consists of a pair of upper and lower shutters.

9. The sheet cassette claimed in claim 1, further comprising a detect portion disposed at an exterior surface of the back side of the housing for identifying a size of the laminate target which can be laminated.

10. The cassette claimed in claim 9, wherein the detect portion consists of projections projecting from both ends of the exterior surface of the back side of the housing.

11. The sheet cassette claimed in claim 1, wherein the sheets further comprise a first sheet having a transparent resin film layer and an adhesive layer, and a second sheet having a non-adhesive, separation type layer.

12. The sheet cassette claimed in claim 1, wherein the sheets further comprise a first sheet having a transparent thin film layer and an adhesive layer, and a second sheet having a magnetic base layer and an adhesive layer.

* * * * *